(12) United States Patent
Maram et al.

(10) Patent No.: US 12,548,978 B2
(45) Date of Patent: *Feb. 10, 2026

(54) EXTERNAL CAVITY LASER WITH MULTIPLE MATERIALS MICRO-RING REFLECTORS

(71) Applicant: FONEX DATA SYSTEMS INC., Saint Laurent (CA)

(72) Inventors: Reza Maram, Saint-Laurent (CA); Mohsen Rezaei, Saint-Laurent (CA); Ali Bayat, Saint-Laurent (CA); MohammadHossein Motavas, Saint-Laurent (CA); Shahab Mahmoudi, Saint-Laurent (CA); Weijia Li, Montréal (CA); David V. Plant, Montréal (CA); Pasquale Ricciardi, Saint-Laurent (CA)

(73) Assignee: FONEX DATA SYSTEMS INC., Saint Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 19/063,845

(22) Filed: Feb. 26, 2025

(65) Prior Publication Data

US 2025/0202199 A1 Jun. 19, 2025

Related U.S. Application Data

(63) Continuation of application No. 18/952,638, filed on Nov. 19, 2024, which is a continuation of application No. PCT/CA2024/050822, filed on Jun. 17, 2024.
(Continued)

(51) Int. Cl.
*H01S 5/14* (2006.01)
*H01S 3/08* (2023.01)
(Continued)

(52) U.S. Cl.
CPC .......... *H01S 5/141* (2013.01); *H01S 3/08063* (2013.01); *H01S 5/0612* (2013.01);
(Continued)

(58) Field of Classification Search
CPC .... H01S 5/141; H01S 3/08063; H01S 5/1032; H01S 5/142; H01S 5/0261; H01S 5/0612; H01S 5/1007; H01S 5/101; H01S 5/1092
See application file for complete search history.

(56) References Cited

U.S. PATENT DOCUMENTS 10,637,208 B1 * 4/2020 Nagarajan ............. H01S 5/0656
10,714,894 B1 * 7/2020 Doerr ...................... H01S 5/101
(Continued)

OTHER PUBLICATIONS

S. Zhang, P. Y. Kam, C. Yu, and J. Chen, "Laser linewidth tolerance of decision-aided maximum likelihood phase estimation in coherent optical M-ary PSK and QAM systems," IEEE Photonics Technology Letters, 2009, vol. 21, No. 15, p. 1075-1077.
(Continued)

*Primary Examiner* — M. A. Golub-Miller
(74) *Attorney, Agent, or Firm* — Bookoff McAndrews, PLLC

(57) ABSTRACT

There is provided an external cavity laser, including: a photonic integrated platform including a gain chip providing a gain medium and at least one reflector chip, the photonic integrated platform including first and second functional layers made of different materials; a resonant cavity optically coupled to the gain medium and including a first and a second micro-ring resonators (MRR) in a Vernier configuration, the first MRR and second MRR extending within respective ones of the first and second functional layers made of different materials and having corresponding group indices, the first and second MRRs having different radii selected in view of said corresponding group indices; and a
(Continued)

tuning mechanism for tuning a spectral response of at least one of the first and second MRR.

23 Claims, 30 Drawing Sheets

Related U.S. Application Data

(60) Provisional application No. 63/613,244, filed on Dec. 21, 2023, provisional application No. 63/513,980, filed on Jul. 17, 2023, provisional application No. 63/508,687, filed on Jun. 16, 2023.

(51) Int. Cl.
  *H01S 5/026* (2006.01)
  *H01S 5/06* (2006.01)
  *H01S 5/10* (2021.01)

(52) U.S. Cl.
  CPC ............ *H01S 5/1032* (2013.01); *H01S 5/142* (2013.01); *H01S 5/0261* (2013.01); *H01S 5/1007* (2013.01); *H01S 5/101* (2013.01); *H01S 5/1092* (2013.01)

(56) References Cited

U.S. PATENT DOCUMENTS

| | | | | |
|---|---|---|---|---|
| 11,728,619 | B2* | 8/2023 | He | H01S 5/2022 372/49.01 |
| 12,278,461 | B1* | 4/2025 | Ensher | H01S 3/106 |
| 2002/0172239 | A1 | 11/2002 | McDonald et al. | |
| 2019/0027898 | A1* | 1/2019 | Bovington | H01S 5/021 |
| 2019/0027899 | A1* | 1/2019 | Krishnamoorthy | H01S 5/021 |
| 2019/0058306 | A1* | 2/2019 | Wen | H01S 5/142 |
| 2020/0067276 | A1 | 2/2020 | Ma et al. | |
| 2021/0021099 | A1 | 1/2021 | Mzbaras et al. | |
| 2021/0239906 | A1* | 8/2021 | Liu | H01S 5/021 |
| 2023/0307887 | A1 | 9/2023 | Stern et al. | |
| 2024/0039242 | A1* | 2/2024 | Tsurugaya | H01S 5/142 |
| 2024/0063602 | A1 | 2/2024 | He et al. | |
| 2025/0038480 | A1* | 1/2025 | Morsche | G02B 6/12019 |
| 2025/0047070 | A1* | 2/2025 | Zhang | H01S 5/14 |

OTHER PUBLICATIONS

He, Lina, Özdemir, Şahin Kaya, Zhu, Jiangang, et al. Detecting single viruses and nanoparticles using whispering gallery microlasers. Nature Nanotechnology, 2011, vol. 6, No. 7, p. 428-432.

Y. Jiang, A. Ludlow, N. Lemke, R. Fox, J. Sherman, L.-S. Ma, and C. Oates, "Making optical atomic clocks more stable with 10-16-level laser stabilization," Nature Photonics 5, 158-161 (2011).

K. Numata, M. Alalusi, L. Stolpner, G. Margaritis, J. Camp, and M. Krainak, "Characteristics of the single longitudinal-mode planar-waveguide external cavity diode laser at 1064 nm," Optics Letters, 2014, vol. 39, No. 7, p. 2101-2104.

M. Faugeron, M. Tran, O. Parillaud, M. Chtioui, Y. Robert, E. Vinet, A. Enard, J. Jacquet, and F. V. Dijk, "Highpower tunable dilute mode DFB laser with low RIN and narrow linewidth," IEEE Photonics Technology Letters, 2013, vol. 25, No. 1, p. 7-10.

Y. A. Akulova, G. A. Fish, P.-C. Koh, C. L. Schow, P. Kozodoy, A. P. Dahl, S. Nakagawa, M. C. Larson, M. P. Mack, T. A. Strand, C. W. Coldren, E. Hegblom, S. K. Penniman, T. Wipiejewski, and L. A. Coldren, "Widely tunable electroabsorption-modulated sampled-grating DBR laser transmitter," IEEE J. Sel. Top. Quantum Electron. 8, 1349-1357 (2002).

Mroziewicz, B. External cavity wavelength tunable semiconductor lasers—a review. Opto-Electron. Rev. 16, 347-366 (2008).

W. Liang et al., "Ultralow noise miniature external cavity semiconductor laser," Nat. Commun., vol. 6, 2015, Art. No. 7371.

P. A. Morton, M. J. Morton, and S. J. Morton, "Ultra low phase noise, high power, hybrid lasers for RF mixing and optical sensing applications," in Proc. IEEE Avionics Vehicle Fiber-Opt. Photon. Conf. (AVFOP), Nov. 2017, pp. 1-2.

Tran, M. A. et al. Ring-resonator based widely-tunable narrow-linewidth Si/InP integrated lasers. IEEE J. Sel. Top. Quantum Electron. 26, 1-14 (2020).

H. Guan et al., "Widely-tunable, narrow-linewidth III-V/silicon hybrid external-cavity laser for coherent communication," Optics Express, vol. 26, No. 7, pp. 7920-7933, 2018.

Verdier, A. et al. Ultrawideband wavelength-tunable hybrid external-cavity lasers. J. Lightw. Technol. 36, 37-43 (2018).

Boller, K.-J. et al. Hybrid integrated semiconductor lasers with silicon nitride feedback circuits. Photonics 7, 4 (2019).

Fan, Y. et al. Hybrid integrated InP—Si3N4 diode laser with a 40-Hz intrinsic linewidth. Optics Express, 2020, vol. 28, No. 15, p. 21713-21728.

Y. Fan et al., "290 Hz intrinsic linewidth from an integrated optical chip-based widely tunable InP—Si3N4 hybrid laser," in Proc. Conf. Lasers Electro-Opt., San Jose, CA, USA, Jun. 2017, p. 1.

Kobayashi, N. et al. Silicon photonic hybrid ring-filter external cavity wavelength tunable lasers. J. Lightw. Technol. 33, 1241-1246 (2015).

Xu, Yilin, et al. "Hybrid external-cavity lasers (ECL) using photonic wire bonds as coupling elements." Scientific reports 11.1 (2021): 16426.

Y. Gao et al., "High-Power, narrow-linewidth, miniaturized silicon photonic tunable laser with accurate frequency control," J. Lightw. Technol., vol. 38, No. 2, pp. 265-271, 2020.

G. T. Reed, G. Mashanovish, F. Y. Gardes, and D. J. Thomson, "Silicon optical modulators," Nature Photonics 4, 548 (2010).

Boynton, Nicholas, et al. "A heterogeneously integrated silicon photonic/lithium niobate travelling wave electro-optic modulator." Optics Express, 2020, vol. 28, No. 2, p. 1868-1884.

C. Doerr, "Silicon photonic integration in telecommunications," Frontiers Phys., vol. 3, p. 37, Aug. 2015.

Blumenthal, Daniel J., et al. "Silicon nitride in silicon photonics." Proceedings of the IEEE 106.12 (2018): 2209-2231.

Siew, Shawn Yohanes, et al. "Review of silicon photonics technology and platform development." Journal of Lightwave Technology 39.13 (2021): 4374-4389.

Guo, Yuyao, et al. "Thermally tuned high-performance III-V/Si 3 N 4 external cavity laser." IEEE Photonics Journal 13.2 (2021): 1-13.

Reimer, Christian, et al. "Generation of multiphoton entangled quantum states by means of integrated frequency combs." Science 351.6278 (2016): 1176-1180.

Stern, Brian, et al. "Athermal silicon photonic wavemeter for broadband and high-accuracy wavelength measurements." Optics Express, 2021, vol. 29, No. 19, p. 29946-29959.

Mahmudlu, Hatam, et al. "Fully on-chip photonic turnkey quantum source for entangled qubit/qudit state generation." Nature Photonics (2023): 1-7.

Sacher, Wesley D., et al. "Monolithically integrated multilayer silicon nitride-on-silicon waveguide platforms for 3-D photonic circuits and devices." Proceedings of the IEEE 106.12 (2018): 2232-2245.

N. M. Fahrenkopf, C. McDonough, G. L. Leake, Z. Su, E. Timurdogan, and D. D. Coolbaugh, "The AIM photonics MPW: A highly accessible cutting edge technology for rapid prototyping of photonic integrated circuits," IEEE J. Sel. Topics Quantum Electron., vol. 25, No. 5, pp. 1-6, Sep. 2019.

Guo, Yuyao, et al. "Hybrid integrated external cavity laser with a 172-nm tuning range." APL Photonics 7.6 (2022): 066101.

Bass, Jake, et al. "Impact of nonlinear effects in Si towards integrated microwave-photonic applications." Optics Express, 2021, vol. 29, No. 19, p. 30844-30856.

Yang, Shuyu, et al. "A single adiabatic microring-based laser in 220 nm silicon-on-insulator." Optics Express, 2014, vol. 22, No. 1, p. 1172-1180.

Corato-Zanarella, Mateus, et al. "Widely tunable and narrow-linewidth chip-scale lasers from near-ultraviolet to near-infrared wavelengths." Nature Photonics, 2023, vol. 17, No. 2, p. 157-164.

(56) References Cited

OTHER PUBLICATIONS

Kues, Michael, Reimer, Christian, Roztocki, Piotr, et al. On-chip generation of high-dimensional entangled quantum states and their coherent control. Nature, 2017, vol. 546, No. 7660, p. 622-626.
Wang, Pengfei, Luo, Guangzhen, Xu, Yang, et al. Design and fabrication of a SiN—Si dual-layer optical phased array chip. Photonics Research, 2020, vol. 8, No. 6, p. 912-919.
Li, Xin, Gao, Wei, Lu, Liangjun, et al. Ultra-low-loss multi-layer 8×8 microring optical switch. Photonics Research, 2023, vol. 11, No. 5, p. 712-723.
Li, Xia, Wang, Chao, Jin, Hao, et al. Wavelength Tunable Cavity Mirror for Silicon Micro-Ring-Based Hybrid Integrated Lasers. IEEE Photonics Technology Letters, 2016, vol. 28, No. 9, p. 935-938.
International Search Report and Written Opinion dated Sep. 26, 2024, issued in corresponding application PCT/CA2024/050822 by the Canadian Intellectual Property Office (11 pages).
Li et al., FMCW Source based on a Hybrid Integrated II••V/ Si•Si3N4 Dua••Layer External Cavity Laser, CLEO 2022 © Optica Publishing Group 2022 (2 Pages).

\* cited by examiner

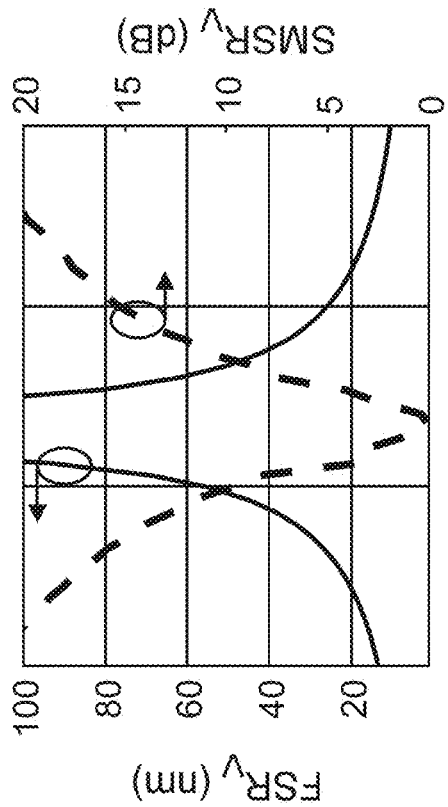
FIG. 4A
FIG. 4B
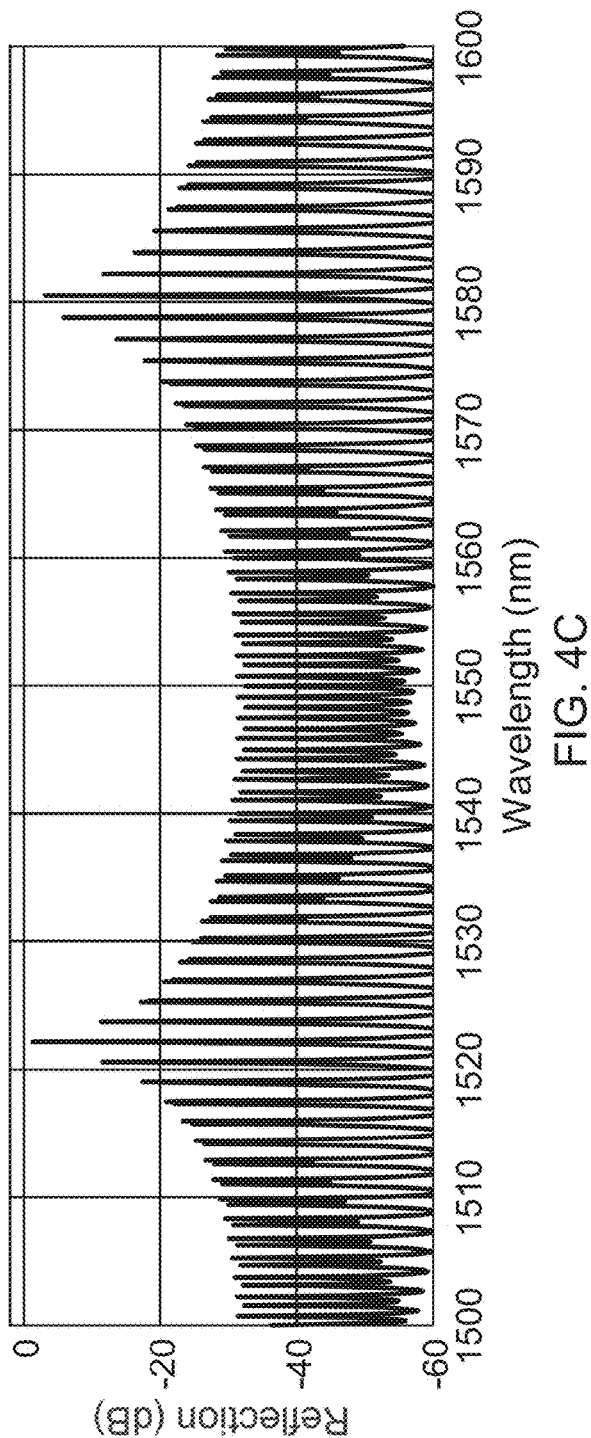
FIG. 4C

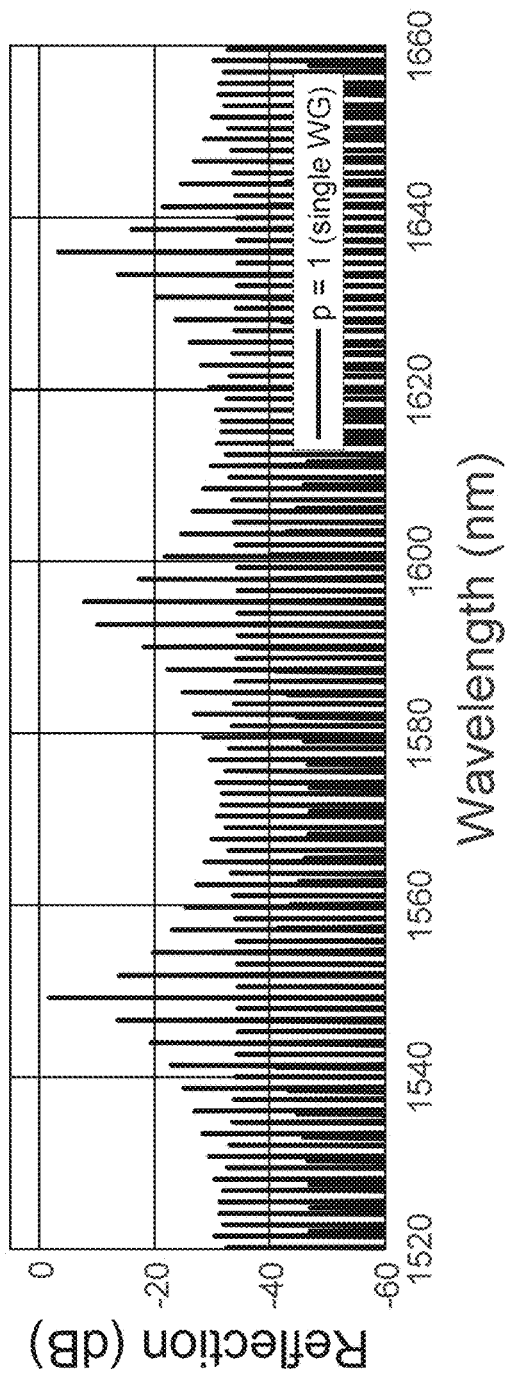
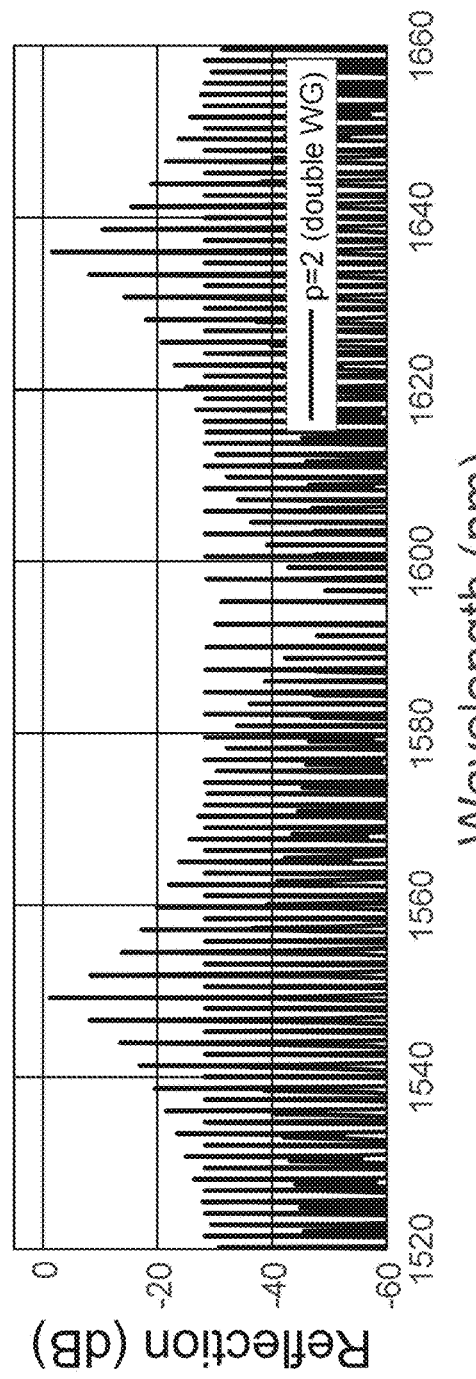
FIG. 8A
FIG. 8B

EXTERNAL CAVITY LASER WITH MULTIPLE MATERIALS MICRO-RING REFLECTORS

CROSS-REFERENCE TO RELATED APPLICATION(S)

This application is a continuation application of U.S. application Ser. No. 18/952,638, filed on Nov. 19, 2024, which is a bypass continuation application of International Application No. PCT/CA2024/050822, filed on Jun. 17, 2024, which claims the benefit of priority of U.S. Application No. 63/508,687, filed on Jun. 16, 2023, U.S. Application No. 63/513,980, filed on Jul. 17, 2023, and U.S. Application No. 63/613,244, filed on Dec. 21, 2023, the entireties of which are incorporated herein by reference.

TECHNICAL FIELD

The technical field generally relates to external cavity lasers.

BACKGROUND

Widely tunable lasers with narrow linewidth are in high demand for various applications, including optical sensing, fiber-optic communications, Global Positioning System (GPS) clocks in space applications, and fundamental metrology. Semiconductor diode lasers, such as distributed feedback (DFB) and distributed Bragg reflector (DBR) lasers, are attractive due to their small form factor, mass producibility and compatibility with integrated circuits. However, they are reaching their limitations in terms of tuning range and spectral linewidth, with some only offering a few nanometers of tuning range or large linewidths around MHz level. The tuning range and/or the linewidth of laser diodes can be further improved by placing them (or the gain media which are essentially the laser diodes with one or two facets antireflection-coated) in an external cavity comprising a frequency-selective element, creating a new class of lasers known as External Cavity Lasers (ECLs). With proper design, ECLs can provide both wider wavelength tunability and narrower linewidth than those of a solitary laser diode. ECLs typically combine a laser diode or gain medium with passive and active external feedback circuits to form a Fabry-Perot (FP) cavity or a ring cavity. The term "external cavity" refers to the configuration where at least part of the feedback circuit or cavity, involving frequency-selective elements, mirrors, or reflectors, is placed outside the gain medium or solitary laser diode, either on one or both sides. This contrasts with solitary diode lasers, where the cavity or feedback circuit components are integral parts of the gain medium or main cavity of the laser diode.

The feedback circuit topology of the current commercialized ECLs is diverse, and may include free-space and fiber-based elements like blazed gratings, high Q whispering resonators, and fiber Bragg gratings (FBGs), among others. Recent advances in photonic integration platforms have created a considerable interest in ECLs that use integrated frequency-selective elements within the external cavity combined with a III-V gain medium. This approach offers several advantages, such as reduced size, weight, and cost compared to traditional counterparts. Additionally, it provides an efficient route towards co-integration of the ECL with other highly functional building blocks.

Various integrated ECL configurations have been demonstrated so far differing in aspects of the feedback circuit such as the type of frequency-selective elements, mirrors or reflectors, optical coupling systems, gain media and integration methods. For example, ECLs on native III-V substrate (such as InP) have been demonstrated where the feedback circuit and gain medium are fabricated monolithically on the same platform in a single process. Additionally, with the surge of Silicon Photonics, recent integrated ECL demonstrations have shown integration of silicon-based feedback circuits with III-V gain media. They generally rely on two main integration approaches: 1) heterogeneous integration, where dies of III-V gain materials are bonded onto passive waveguides for further front-end of line processing on a wafer scale, and 2) hybrid integration, where readily processed III-V gain materials are attached to passive feedback circuits in a back-end of line assembly process. On one hand, hybrid integration is non-invasive to the front-end fabrication process flow of the passive external cavity circuit and can thus be applied to a wide range of integration platforms. On the other hand, heterogeneous integration could be the clear path towards scaling and high-volume production.

Regardless of the integration type, one key part to the ECLs is the design of the external cavity feedback circuit, which is commonly achieved by utilizing the Vernier effect, being realizing both with sampled Bragg grating reflectors and more commonly with microring resonators (MRRs), in conjugation with other passive and active components. The design of the frequency selective elements of the feedback circuit impacts key laser parameters, including the wavelength tuning range, linewidth, side mode suppression ratio (SMSR), wavelength and single-mode lasing stability, wavelength tuning power consumption, and to a certain extent, the maximum output power. Note that wavelength tuning power consumption refers to the energy consumed in tuning the wavelength through methods such as thermal tuning via metallic or doped heaters, and/or the plasma dispersion effect via doped PN junctions, and the maximum output power indicates that the mirror circuit could impose limitations on the maximum output power level due to non-idealities such as nonlinearities.

FIGS. 1A and 1B (PRIOR ART) show the typical configurations of silicon based ECLs 100 forming Fabry-Perot cavities, as for example shown in Tran, M. A. et al. "*Ring-resonator based widely-tunable narrow-linewidth Si/InP integrated lasers*", IEEE J. Sel. Top. Quantum Electron. 26, 1-14 (2020). Both illustrated ECLs 100 include a gain section 102 provided between a passive cavity reflector 104 and a tunable cavity reflector 106 forming a frequency selective feedback circuit. The tunable cavity reflector 106 includes a pair of micro-ring resonators (MRRs) 108 and 110 cascaded in add-drop configuration. The MRRs can be placed in a loop configuration, as in FIG. 1A, or a separate loop mirror 112 can be added to the end of the MRR cascade, as shown in FIG. 1B. Broadband and/or tunable couplers are typically used to form the loop of the structures. The tunable cavity reflector 106 serves as a single wavelength filter for the ECL 100, and a phase shifter 114 positioned between the gain section 102 and tunable cavity reflector 106 is used to tune the laser cavity modes. FIG. 1C shows another example of an ECL configuration in which the Vernier-based frequency feedback circuit is formed using two MRRs 108, 110 in a ring cavity. The MRRs 108, 110 are coupled by two bus waveguides 116*a*, 116*b* with a gain region 102 in between. In all topologies, the cascaded MRRs 108 and 110 are designed in a Vernier configuration, whereby they have slightly different radii, giving slightly different free spectral ranges (FSRs), to obtain a Vernier effect and therefore shape the Vernier spectrum needed for wavelength tuning. The laser's optical output, whether as the main output or a monitoring output, can be extracted from various points within the laser structure. These points include the high-reflectivity (HR) mirror 104, the ports of the MRRs, and the coupler. For the latter, this is applicable if the coupler is non-symmetric (other than 50%/50%) or if a tunable coupler is employed.

As understood by those skilled in the art, the so-called Vernier Effect uses two (or more) resonators at two (or more) different resonant frequencies having FSRs that are slightly different, such that they overlap perfectly only at multiples of their individual FSRs. The FSR of a given MRR for light at a wavelength $\lambda$ is given by $FSR_i = \lambda^2/2\pi n_g R_i$, where $FSR_i$ is the FSR of the $i^{th}$ MRR, $R_i$ is the MRR radius and $n_g$ group index of the MRR waveguide. By convention, the Vernier FSR of a pair of MRRs such as shown in FIGS. 1A and 1B is determined by:

$$FSR_V \approx \frac{FSR_1 \times FSR_2}{|FSR_1 - FSR_2|} \approx \frac{\lambda^2}{n_g 2\pi |R_2 - R_1|} \quad (1)$$

$$R_2 \approx \frac{(m-1)}{m} R_1, \quad (2)$$

where m and m−1 are coprime integers for any m in a two MRR Vernier filter. m and m−1 numbers are known as resonant numbers of the corresponding MRR. m also quantifies the increased tuning efficiency of the Vernier MRRs in comparison to a single MRR, i.e., $m \approx FSR_V/FSR_1$.

FIGS. 1D and 1E (PRIOR ART) show an example of the spectral responses of a dual MRR mirror 106 such as shown in either one of FIGS. 1A and 1B, with cross-coupling coefficients of $\kappa_1 = \kappa_2 = 0.23$ and MRR radii of $R_1 = 32.5$ µm and $R_2 = 25$ µm. FIG. 1C shows the individual spectra of the MRRs with several-nm FSRs. The synthesized spectral response of the dual-MRR mirror, FIG. 1E, shows a much broader FSR ($FSR_V \approx (m-1)FSR_2 \approx mFSR_1$). This Vernier FSR sets the range for the wavelength tuning of an ECL.

There have been numerous implementations of MRR-based reflectors using various materials including silicon and indium phosphide (InP), and other compound semiconductors. In particular, silicon-based reflectors are commonly implemented on standard Silicon-on-Insulator (SOI) or Silicon Nitride (SiN). The mature SOI platform, often simply referred to as the Silicon (Si) platform—these terms being used interchangeably in the art, is particularly advantageous for ECL feedback circuits due to its compatibility with a wide range of active and passive silicon photonic devices, lower fabrication cost and smaller footprint.

Despite its numerous benefits, the SOI platform presents certain challenges for ECL implementation. Standard Si photonics typically employ high-contrast waveguides, consisting of a silicon core surrounded by an oxide cladding, which tightly confines light in the core. This results in compact ECL feedback circuits with small routing bends, MRR radii, and moderate waveguide losses of around 1.5 to 3 dB/cm. ECLs with these waveguide losses have demonstrated linewidths between about 37 kHz and 27 MHz and output powers ranging from about 0 to 13 dBm; the higher the MRR Q-factor, the lower the linewidth and output power. To further reduce waveguide losses and thus linewidth in the SOI platform, J. Bowers team employed low-loss rib waveguides (~0.2 dB/cm) in a heterogeneously integrated ECL, achieving a linewidth record of 220 Hz on the Si platform. This came at the cost of larger MRRs and a more complex three-MRR mirror to maintain wide-band tunability [Tran, M. A. et al. supra]. In other prior art implementations. even smaller linewidths of 40 Hz were achieved using ultra-low-loss SiN waveguides (~0.1 dB/cm) in the feedback circuit [Fan, Y. et al. "*Hybrid integrated InP-Si3N4 diode laser with a 40-Hz intrinsic linewidth*", Opt. Express 28, 21713-21728 (2020); Y. Fan et al., "*290 Hz intrinsic linewidth from an integrated optical chip-based widely tunable InP-Si3N4 hybrid laser*", in Proc. Conf. Lasers Electro-Opt., San Jose, CA, USA, June 2017, p. 1].

Another challenge of Si-based feedback circuits is the nonlinear loss caused by two-photon absorption and the resulting free-carrier absorption. Two-photon absorption ultimately limits the intra-cavity power and the total output power of the ECL. This problem can also be overcome by employing SiN-based feedback circuits, as demonstrated for example in Boller, K.-J. et al. "*Hybrid integrated semiconductor lasers with silicon nitride feedback circuits*", Photonics 7, 4 (2019), where the authors developed a hybrid ECL that achieved record-high output powers of more than 20 dBm. Alternatively, high output power in Si-based ECLs can be achieved by amplifying the laser emission with an external SOA (see Y. Gao et al., "*High-Power, narrow-linewidth, miniaturized silicon photonic tunable laser with accurate frequency control*", J. Lightw. Technol., vol. 38, no. 2, pp. 265-271, 2020).

A further challenge faced when integrating gain and feedback circuits is the waveguide mode mismatch between the gain chip and the feedback circuit chip. Si waveguides typically have a large mode mismatch, which leads to high chip-to-chip coupling losses. To reduce losses below 2 dB, polymer spot size converters can be carefully designed on the Si chip, which comes with an increased process complexity. Alternatively, inverse tapers can be designed on both active and passive chips to minimize losses. Additionally, the photonic wire bonding technique [Xu, Yilin, et al. "*Hybrid external-cavity lasers (ECL) using photonic wire bonds as coupling elements*", Scientific reports 11.1 (2021): 16426] can be employed to further reduce coupling loss.

There remains a need for MRR-based reflector configurations for ECLs that mitigate at least some of the drawbacks of the prior art.

SUMMARY

In accordance with one aspect, there is provided an external cavity laser, comprising:
    a gain chip providing a gain medium;
    a reflector chip comprising functional layers made of different materials;
    and
    a resonant cavity, comprising:
        a fixed cavity reflector optically coupled to one extremity of the gain chip;
        a tunable cavity reflector provided on the reflector chip and optically coupled to an extremity of the gain chip opposite the fixed cavity reflector, the tunable cavity reflector comprising a first and a second micro-ring resonators (MRR) in a Vernier configuration, the first MRR and second MRR extending within respective ones of the functional layers made of different materials and having corresponding group indices, the first and second MRRs having different radii selected in view of said corresponding group indices; and
        a tuning mechanism for tuning a spectral response of at least one of the first and second MRR.

In accordance with one aspect, there is provided an external cavity laser, including: a photonic integrated platform including a gain chip providing a gain medium and at least one reflector chip, the photonic integrated platform including first and second functional layers made of different materials; a resonant cavity optically coupled to the gain medium and including a first and a second micro-ring resonators (MRR) in a Vernier configuration, the first MRR and second MRR extending within respective ones of the first and second functional layers made of different materials and having corresponding group indices, the first and second MRRs having different radii selected in view of said corresponding group indices; and a tuning mechanism for tuning a spectral response of at least one of the first and second MRR.

In some embodiments, the gain chip includes a semiconductor optical amplifier.

In some embodiments, the gain medium is quantum well-based, quantum wire-based, quantum dot-based or quantum dash-based.

In some embodiments, each of the at least one reflector chip includes a substrate and a cladding extending over the substrate, each of the first and second functional layers being embedded in the cladding of one of said at least one reflector chip.

In some embodiments, the substrate of the reflector chip is made of Si, and the cladding of the reflector chip is made of SiO2.

In some embodiments, the material of the first functional layer is Si, and the material of second the function layer is SiN.

In some embodiments, the materials of the first and second functional layers are each independently selected from the list consisting of Silicon (Si), Silicon Nitride (SiN), Indium Phosphide (InP), Gallium Arsenide (GaAs), Gallium Nitride (GaN), Aluminum Nitride (AlN), Indium Gallium Arsenide Phosphide (InGaAsP), Indium Gallium Arsenide Antimonide (InGaAsSb), Mercury Cadmium Telluride (HgCdTe), Gallium Nitride (GaN), Aluminum Nitride (AlN), Gallium Arsenide (GaAs), Aluminum Gallium Arsenide (AlGaAs) Aluminum Nitride (AlN), QXP, and Lithium Niobate (LiNbO3), Barium Titanate BaTiO3 (BTO), or binary, ternary, and quaternary compounds and alloys thereof.

In some embodiments, a ratio of the radii of the first and second MRRs is proportional to a ratio of their group indices.

In some embodiments, the ratio of the radii of the first and second MRRs substantially corresponds to:

$$\frac{R_2}{R_1} \approx \frac{(m-1)}{m} \frac{n_{g_1}}{n_{g_2}},$$

wherein R1 is the radius of the first MRR, R2 is the radius of the second MRR, ng1 is the group index of the material of the first MRR, ng2 is the group index of the material of the second MRR, and m is a tuning enhancement factor.

In some embodiments, the ratio of the radii of the first and second MRRs substantially corresponds to:

$$\frac{R_2}{R_1} \approx \frac{(m-1)}{N \times m} \frac{n_{g_1}}{n_{g_2}},$$

wherein R1 is the radius of the first MRR, R2 is the radius of the second MRR, ng1 is the group index of the material of the first MRR, ng2 is the group index of the material of the second MRR, m is a tuning enhancement factor and N is a reduction factor associate with the material of the first MRR.

In some embodiments, the resonant cavity has a Fabry-Perot configuration and includes a fixed cavity reflector optically coupled to one extremity of the gain medium, the first and second MRRs forming a tunable cavity reflector optically coupled to an extremity of the gain medium opposite the fixed cavity reflector.

In some embodiments, the fixed cavity reflector includes a layer of reflective material extending along a surface of the gain chip. In some embodiments, the resonant cavity has a ring configuration.

In some embodiments, the at least one reflector chip consists of a monolithic reflector chip integrating the first and second function layers.

In some embodiments, the external cavity laser includes a waveguide structure defining said resonant cavity, the waveguide structure including: the first and second MRRs; one or more waveguide branches extending in each functional layer; and one or more optical vias allowing light to travel between the functional layers of the monolithic reflector chip.

In some embodiments, the at least one reflector chip includes a first and a second reflector chip in a hybrid configuration, the first reflector chip integrating the first functional layer and the second reflector chip integrating the second functional layer.

In some embodiments, the external cavity laser includes a waveguide structure defining said resonant cavity, the waveguide structure including: the first and second MRRs; one or more waveguide branches extending in each functional layer; and one or more optical edge couplers or grating couplers allowing light to travel between the functional layers of the first and second reflector chips.

In some embodiments, the first functional layer is hosted in the gain chip and the second functional layer is integrated in the one of said at least one reflector chip.

In some embodiments, the external cavity laser includes a waveguide structure defining said resonant cavity, the waveguide structure including: the first and second MRRs; one or more waveguide branches extending in each functional layer; and one or more optical vias allowing light to travel between the functional layers of the gain chip and the one of said at least one reflector chip.

In some embodiments, the waveguide structure includes a coupler separating light into clockwise and counterclockwise portions travelling in opposite directions through said waveguide structure.

In some embodiments, the waveguide structure includes a loop mirror closing said feedback circuit.

In some embodiments, one of the first and second MRRs is inside the loop mirror.

In some embodiments, the first and second MRRs are optically connected through at least two of said waveguide branches.

In some embodiments, at least one of the first and second MRRs includes a plurality of MRR components.

In some embodiments, the waveguide structure includes a Mach-Zehnder interferometer integrated with at least one of the first and second MRRs.

In some embodiments, at least one of the first and second MRRs has a variable width section.

In some embodiments, the external cavity laser further includes a frequency-stabilization mechanism, the frequency-stabilization including: a monitoring photodetector configured for measuring an estimated optical power outputted by the external cavity laser; a first heater being thermally connected with the second MRR to tune a resonance of the second MRR, based on the estimated optical power; and a second heater being thermally connected with the first MRR to tune a resonance of the first MRR, based on the estimated optical power.

In some embodiments, a distance between the first heater and the second MRR is smaller than a distance between the second heater and the first MRR.

In some embodiments, the external cavity laser further includes a 90-degree coupler optically coupled with the first MRR and the second MRR to measure a phase difference between the external laser cavity's outputs.

In some embodiments, the first heater and the second heater are respectively monolithically integrated with the second MRR and the first MRR.

In some embodiments, the external cavity laser further includes a plurality of temperature sensors positioned between the gain chip and the resonant cavity, the plurality of temperature sensors being configured to monitor a thermal wave propagation, wherein the first heater and the second heater are adjusted based on the monitored heat transfer.

In some embodiments, the external cavity laser includes a plurality of studs, each being connected to a corresponding one of the plurality of temperature sensors and extending through the first and second functional layers.

In some embodiments, the external cavity laser further includes auxiliary temperature sensors configured to measure external thermal perturbations.

Other features and advantages will be better understood upon reading of detailed embodiments with reference to the appended drawings.

BRIEF DESCRIPTION OF THE DRAWINGS

FIGS. 4A to 4C are graphs respectively showing the group indices of Si and SiN waveguides vs. wavelength (FIG. 4A), the Vernier FSR change and SMSR vs. $R_{Si}$ for a fixed $R_{SiN}$ value of 115 μm (FIG. 4B), and the simulated transmission spectrum of the hybrid Si—SiN mirror.

FIGS. 8A and 8B are graphs of simulated transmission spectra of a hybrid Si—SiN mirror having p output waveguide branches for p=1 (FIG. 8A) and p=2 (FIG. 8B).

DETAILED DESCRIPTION

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the present description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

In the present description, when a broad range of numerical values is provided, any possible narrower range within the boundaries of the broader range is also contemplated. For example, if a broad range value of from 0 to 1000 is provided, any narrower range between 0 and 1000 is also contemplated. If a broad range value of from 0 to 1 is mentioned, any narrower range between 0 and 1, i.e. with decimal value, is also contemplated.

In accordance with one aspect, there is provided an External Cavity Laser, hereinafter referred to as an ECL. ECLs according to embodiments described herein may be used in the context of various applications, such as optical sensing, fiber-optic communications, Global Positioning System (GPS), clocks in space applications, fundamental metrology, and the like. In accordance with one aspect, as described further below, ECLs described herein bring a new perspective by integrating multiple materials into the Vernier frequency selective reflector based on MRRs in the ECL design. In some implementations, MRR-based ECLs that harness the strengths of different material platforms in the feedback circuit to enhance performance and broadened applications are described.

In some implementations, the ECL includes a photonic integrated platform, a resonant cavity and a tuning mechanism. As understood by those skilled in the art, integrated photonics refers to on-chip technology in which at least one component providing on optical function is provided. The photonic integrated platform includes a gain and at least one reflector chip. Various non-limitative configurations of the photonic integrated platform are described below. As will also bee explained below, the photonic integrated platform includes first and second functional layers made of different materials. The first and second functional layers may both extend on one of the chips of the photonic integrated platform, typically on a reflector chip, or be provided on two separate chips.

ECL Configuration

Figure 1B:
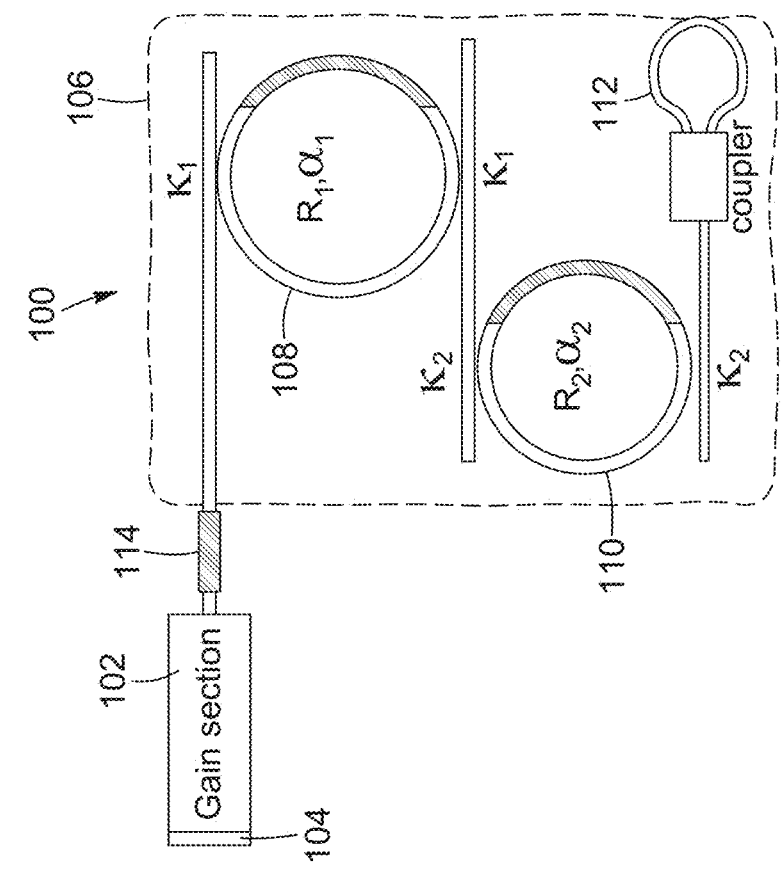
FIGS. 1A, 1B and 1C (PRIOR ART) are schematic representation of ECL configurations according to prior art.
Figure 1A:
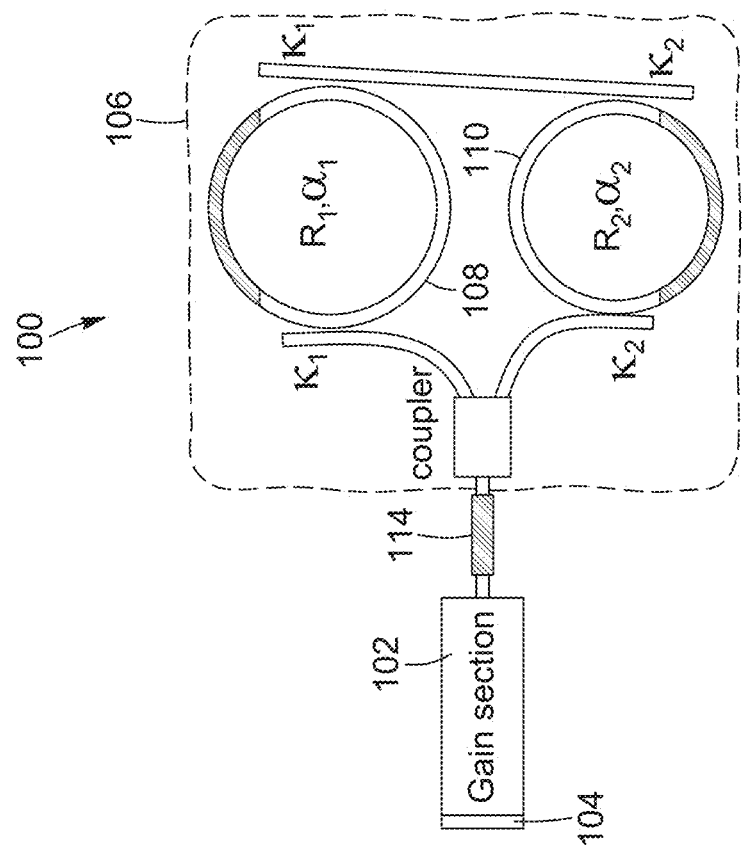
Figure 1C:
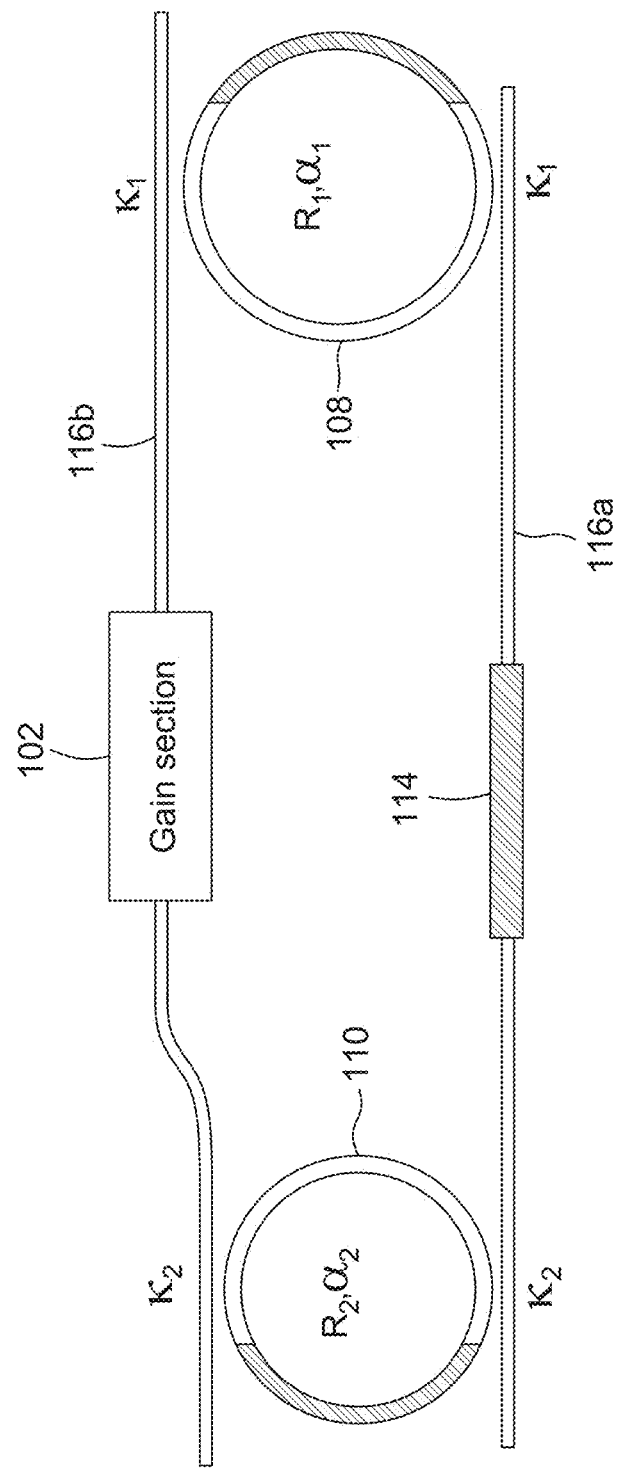
Figure 1D:
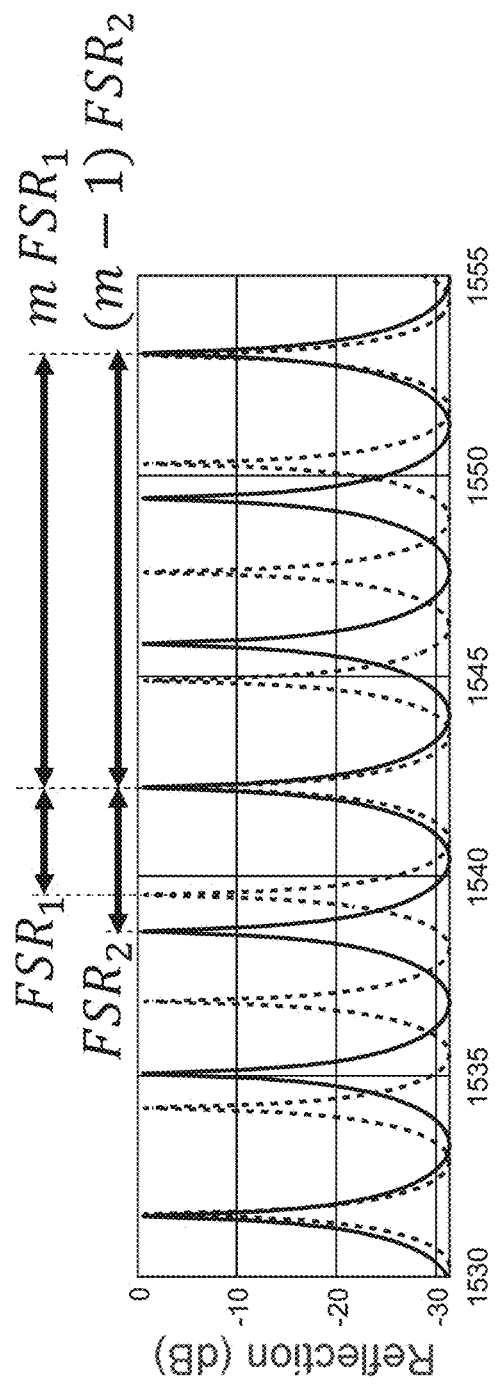
FIGS. 1D and 1E are spectra of the individual spectra of the MRRs (FIG. 1D) and the Vernier reflection spectrum (FIG. 1E).
Figure 1E:
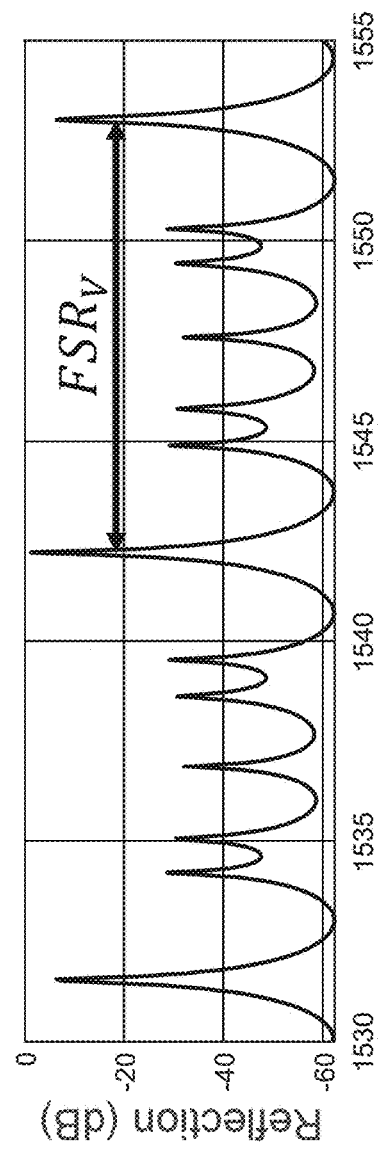
Figure 2A:
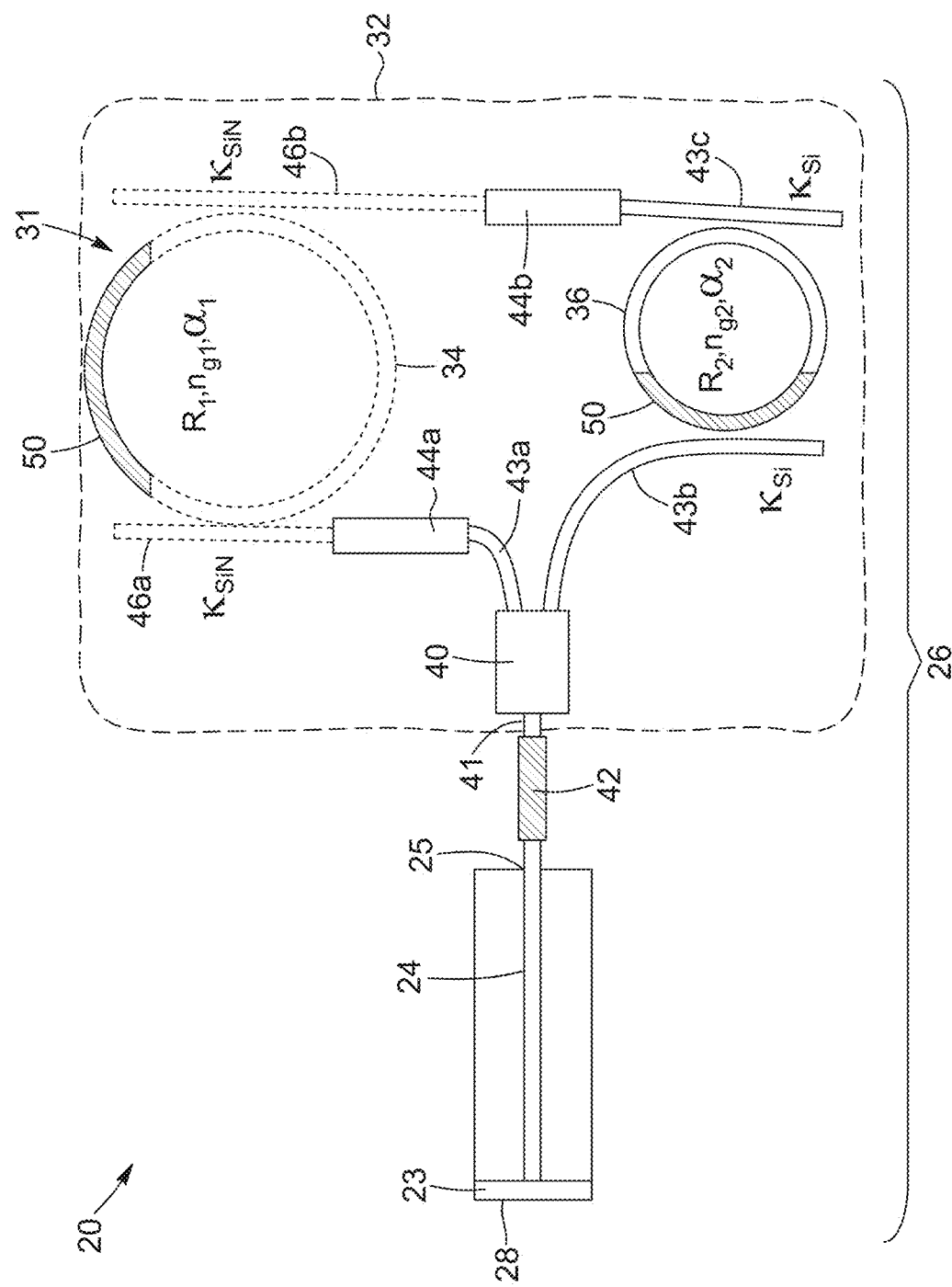
FIG. 2A is a schematic representation of an ECL configuration according to one embodiment.
Figure 2B:
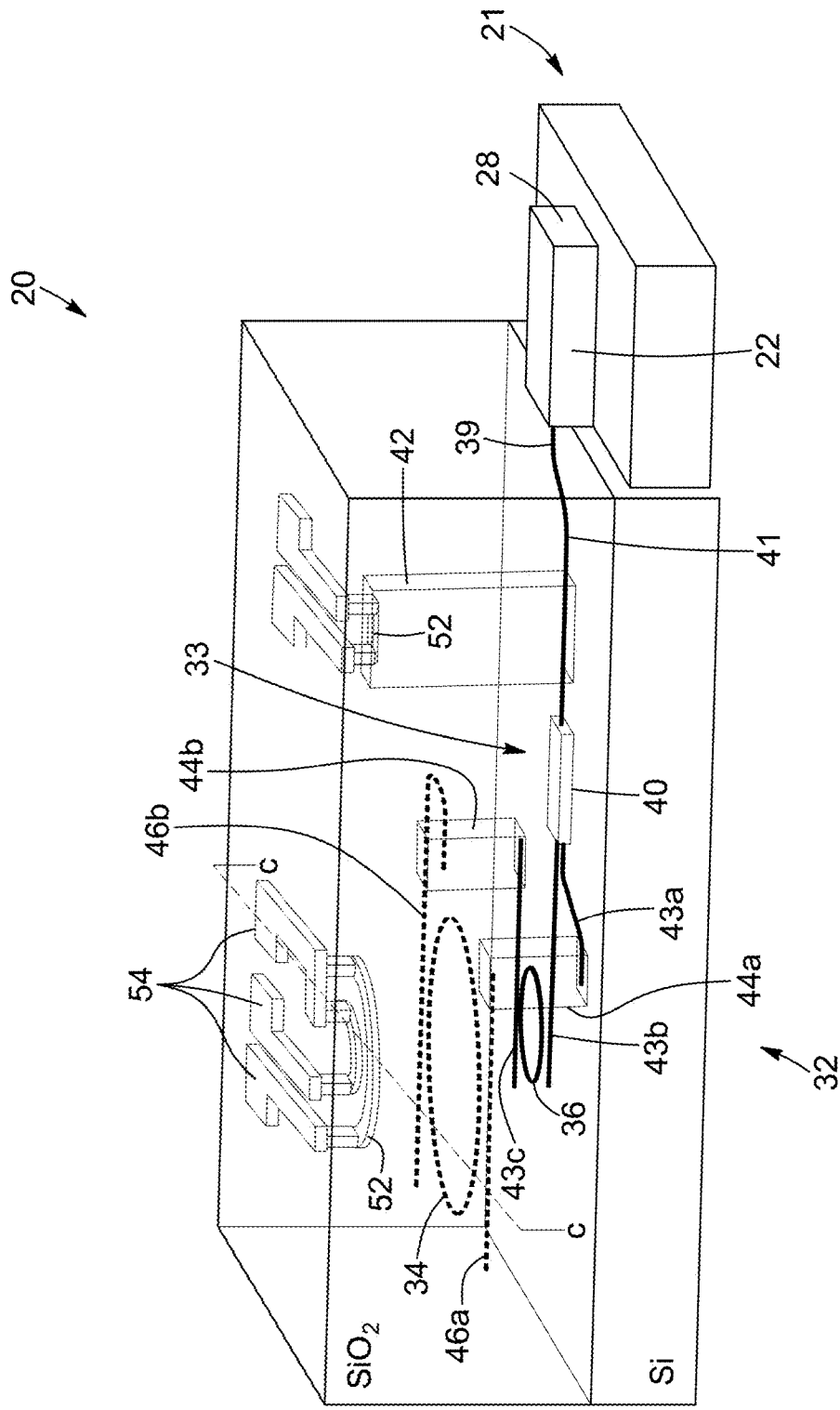
FIG. 2B is a side elevation view in partial transparency of a photonic integrated platform embodying the configuration of FIG. 2A.
Figure 2C:
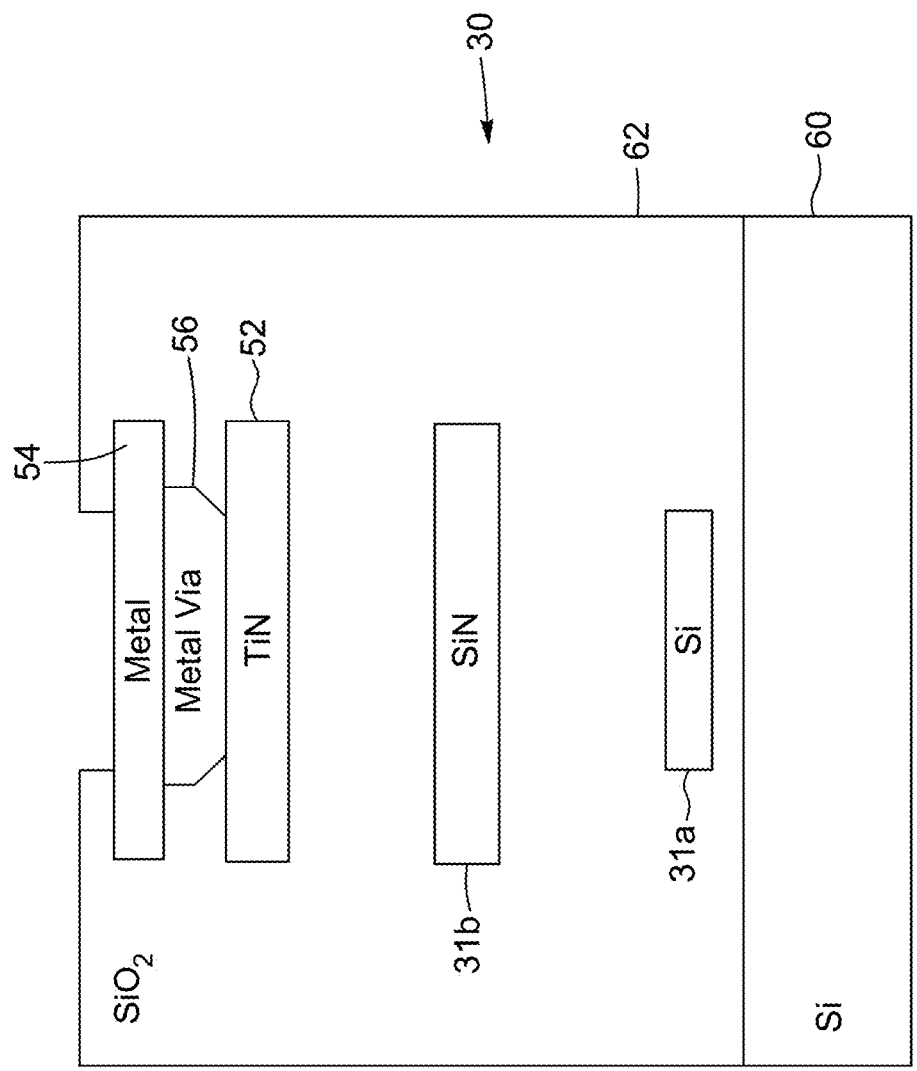
FIG. 2C is a cross-section along lines C-C of FIG. 2B.

Referring to FIGS. 2A, 2B and 2C, an ECL 20 according to one embodiment is schematically illustrated. As mentioned, the ECL 20 includes a photonic platform 21, in this example including a gain chip 22 and one or more reflector chips 30. Although the example of these figures is used as a basis for describing the components of an ECL, it will be readily understood that the same considerations and options may be applied to other variants, such as for example described further below.

The gain chip 22 of the ECL 20 provides a gain medium configured to enable amplification of light. The gain chip 22 may have any structure known in the art. For example, the gain chip may be embodied by a Semiconductor Optical Amplifier (SOA) using a direct bandgap III-V medium such InP or the like, depending on the wavelength of interest. In some implementations, the gain chip includes a gain waveguide 24 embodying the gain medium. The gain medium may be quantum well-based, quantum dash-based or quantum dot-based. It will be readily understood that in other variants the gain medium may be embodied by any material or structure amplifying light via stimulated emission, the choice of gain medium determining the operational wavelength of the laser. SOAs, such as those based on InP, are for example commonly used in lasers that operate in the 1300-1600 nm wavelength range. A Fabry-Perot diode laser can also be used as the gain medium of the ECL. In other examples, gain media without semiconductors may be used, such as EDFAs, etc. The gain medium may have a bandwidth covering the C-band, L-Band, O-band or any other wavelength range providing amplification at the required wavelengths for the lasing of the ECL to occur at the desired output wavelength.

The ECL 20 further includes a resonant cavity 26 optically coupled to the gain medium 22. In the illustrated variant, the resonant cavity has a Fabry-Perot configuration, also understood as a linear cavity. As known in the art, a Fabry-Perot cavity may be defined by a pair of light reflectors, or mirrors, provided at opposite ends of the gain waveguide 24. In some implementations, such as shown in the illustrated variant of FIGS. 2A, 2B and 2C, the pair of light reflectors may include a fixed cavity reflector 28 optically coupled to one extremity 23 of the gain waveguide 24, and a tunable cavity reflector 32 optically coupled to an extremity 25 of the gain waveguide 24 opposite the fixed cavity reflector 28.

The expression "fixed cavity reflector" will be understood by one a skilled in the art as a reflector that is not tunable, or passive. In some implementations, such as shown in FIGS. 2A and 2B, the fixed cavity reflector 28 may be embodied by a layer of reflective material deposited on a surface at the corresponding extremity 23 of the gain chip 22, embodying a Reflective Semiconductor Optical Amplifier (RSOA) design. It will however be readily understood that the fixed cavity reflector may alternatively be external to the gain chip, and for example includes a separate mirror, a Sagnac loop mirror (see FIG. 5A), or the like.

As mentioned above the ECL 20 of the illustrated variant includes a reflector chip 30, on which is provided the tunable cavity reflector 32. The reflector chip 30 is external to the gain chip 22, as is inherent to an ECL design. The reflector chip 30 may be embodied by a SOI structure comprising several layers. In some implementations, as best seen in FIG. 2C, the reflector chip 30 may include a substrate 60, for example made of Si, on which is provided a cladding 62, for example made of $SiO_2$. In typical embodiments, the reflector chip includes one of more of the functional layers 31a, 31b of different materials embedded in the cladding 62. The different materials may be silicon-based such as Si, SiN, or the like. In the illustrated embodiment of FIGS. 2B and 2C and several other figures herein, an Si functional layer 31a and a SiN function layer 31b are shown. It will however be readily understood by one skilled in the art that any of the embodiments disclosed herein and variants thereof may be implemented using different combination of materials as the functional layers 31a, 31b. In some implementations, non-silicon materials may be used, such as Indium Phosphide (InP), Gallium Arsenide (GaAs), Gallium Nitride (GaN), Aluminum Nitride (AlN), along with their respective binary, ternary, and quaternary compounds and alloys. For example, Indium Gallium Arsenide Phosphide (InGaAsP) is used for the C—O bands (1200 nm-1700 nm), Indium Gallium Arsenide Antimonide (InGaAsSb) and Mercury Cadmium Telluride (HgCdTe) are suitable for wavelengths above 1700 nm in the mid-infrared region, Gallium Nitride (GaN), Aluminum Nitride (AlN), and their alloys (e.g., InGaN, AlGaN) cover the ultraviolet to blue range (100 nm-400 nm), and Gallium Arsenide (GaAs) and Aluminum Gallium Arsenide (AlGaAs) are used for the visible to near-infrared range (400 nm-1200 nm). Additionally, materials like Aluminum Nitride (AlN), SiN, QXP, and Lithium Niobate (LiNbO3), Barium Titanate BaTiO3 (BTO) are notable for their broader wavelength coverage across multiple regions, also providing large Pockels coefficient, and slow wave propagation in the two latter cases for instance. Any combination of two or more of these materials (also including Si), could be used to form the MRR-based Vernier reflector, for example InP and SiN, AlN and SiN, etc. In another example, one of the functional layers 31a, 31b may be made of QXP also referred to as high refractive index silica glass or Hydex (see for example Kues, M., Reimer, C., Roztocki, P. et al. On-chip generation of high-dimensional entangled quantum states and their coherent control. Nature 546, 622-626 (2017).)

Figure 2D:
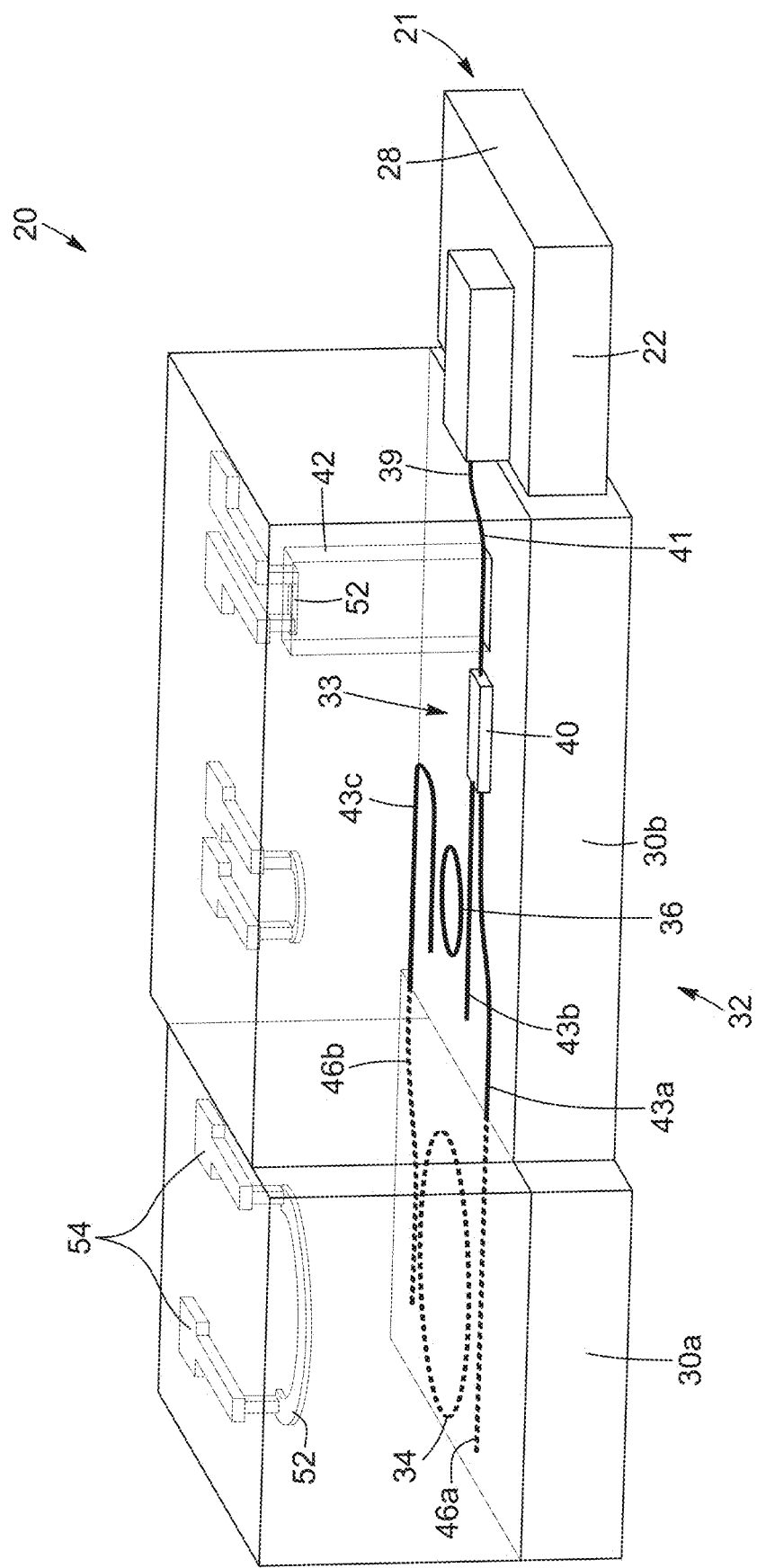
FIG. 2D is a side elevation view in partial transparency of an alternative photonic integrated platform embodying the configuration of FIG. 2A.

In some implementations, the first and second functional layers 31a, 31b may be provided on a same reflector chip or on two different ones. In the illustrated variant of FIGS. 2B and 2C, the at least one reflector chip consists of a monolithic reflector chip 30 integrating both the first and the second functional layers 31a, 31b. In other variants, such as for example shown in FIG. 2D, the at least one reflector chip may include a first and a second reflector chip 30a, 30b in a hybrid configuration, wherein the first reflector chip 30a integrates the first functional layer 31a and the second reflector chip 30b integrates the second functional layer. Of course, other configurations may also be considered.

In some embodiments, a waveguide structure 33 may be provided in the reflector chip 30 to receive, guide and reflect light to form an ECL feedback circuit, hence performing the reflecting function of the tunable cavity reflector 32. The waveguide structure 33 may typically include one or more waveguide branches 43, 46 in the functional layers 31a, 31b, designed to guide light throughout the tunable cavity reflector 32 and coupled together and to the first and second MRRs (defined below) in a variety of possible configurations, several of which are presented below. Light may be coupled between the gain chip 22 and the reflector chip 30 in any manner known in the art. Other optical components may be integrated in the tunable cavity reflector 32, such as one or more couplers 40, phase shifters 42 or the like.

The tunable cavity reflector 32 includes a first and a second micro-ring resonators (MRR) 34 and 36. As their name entails, the first and second MRRs each defined a ring-shaped waveguide provided in the reflector chip 30 as part of the waveguide structure 33, each forming a closed loop of corresponding radius $R_i$. The MRRs 34 and 36 preferably extend generally parallel to the substrate 60 and are each provided in a different one of the functional layers 31a, 31b of the reflector chip 30. In some implementations, the first and second MRRs 34 and 36 may respectively extend at different heights h from the substrate 60. In one variant, such as shown in FIG. 2B, the first and second MRRs 34 and 36 may be stacked one above the other, substantially or partially. In other implementations, such as shown in FIG. 5B, the first and second MRRs 34 and 36 may extend laterally offset from each other.

The first and second MRRs are positioned within the reflector chip 30 so as to perform the reflecting function of the tunable cavity reflector 32. By way of example, FIGS. 2A and 2B shows a configuration where the first and second MRRs 34 and 36 are positioned in a loop mirror configuration. It will be readily understood that the specifications of this configurations are but one manner of implementing the tunable cavity reflector 32 and that is other variants, the different components of the tunable cavity reflector may be arrange differently and be provided in different functional layers 31 than illustrated here, depending on design considerations and target specifications. In this configuration, the waveguide structure 33 of the tunable cavity reflector 32 includes an input-output waveguide 41 provided in the Si functional layer 31a and optically coupled to the gain waveguide 24 through an angled taper spot-size converter 39. An optional phase shifter 42 may be provided to tune the cavity modes. The waveguide structure 33 next includes a coupler 40 optically coupling the input/output waveguide 41 to a first and a second Si-layer waveguide branches 43a and 43b, also provided in the Si functional layer 31a. A first optical via 44a optically couples the first Si waveguide branch 43a, in the Si functional layer 31a, to a first SiN-layer waveguide branch 46a, provided in the SiN functional layer 31b and optically coupled to the first MRR 34. A second optical via 44b allows light to travel between a second SiN-layer waveguide branch 46b provided in the SiN layer 31b and also optically coupled to the first MRR 34, to third Si-layer waveguide branch 43c which is provided in the Si function layer 31a and is optically coupled to the second MRR 36. The second MRR 36 is finally optically coupled to the second Si-layer waveguide branch 43b.

In such a configuration, light from the gain chip 22 entering the tunable cavity reflector 32 travels from the input/output waveguide 41 to the coupler 40 at which it is then split into two light portions, respectively travelling clockwise and counterclockwise through the waveguide structure 33. The clockwise light portion travels sequentially in the first Si-layer waveguide branch 43a, through the first optical via 44a into the first SiN-layer waveguide branch 46a, then around the first MRR 34. The clockwise portion is then coupled into the second SiN-layer waveguide branch 46b, through the second optical via 44b into the third Si-Layer waveguide branch 43c, around the second MRR 36 and back to the coupler 40 through the second Si-layer waveguide branch 43b. The counterclockwise light portion travels from the second Si-layer waveguide branch 43b though the same components in the reverse order. Both the clockwise and counterclockwise light portions are combined by the coupler 40 and finally carried out of the tunable cavity reflector 32 through input/output waveguide 41.

As will be readily understood by one skilled in the art, an optical output of the ECL whether as the main output or a monitoring output, may be provided from various points within the laser structure to extract light therefrom. By way of example, the optical output may be provided at the fixed reflector 28, any port of the MRRs 34, 36, or at the coupler 40. For the latter, this is applicable if the coupler is non-symmetric (other than 50%/50%) or if a tunable coupler is employed.

It will be readily understood that reference to "first" and "second" MRRs in the context of the present description is made for ease of reference only and is not meant to impart a particular order or level of importance to the MRRs. Furthermore, it will be readily understood that the ECL may include more then two MRRs, and that the MRRs may be configured in a variety of other manners. Other examples are provided further below.

Figure 3A:
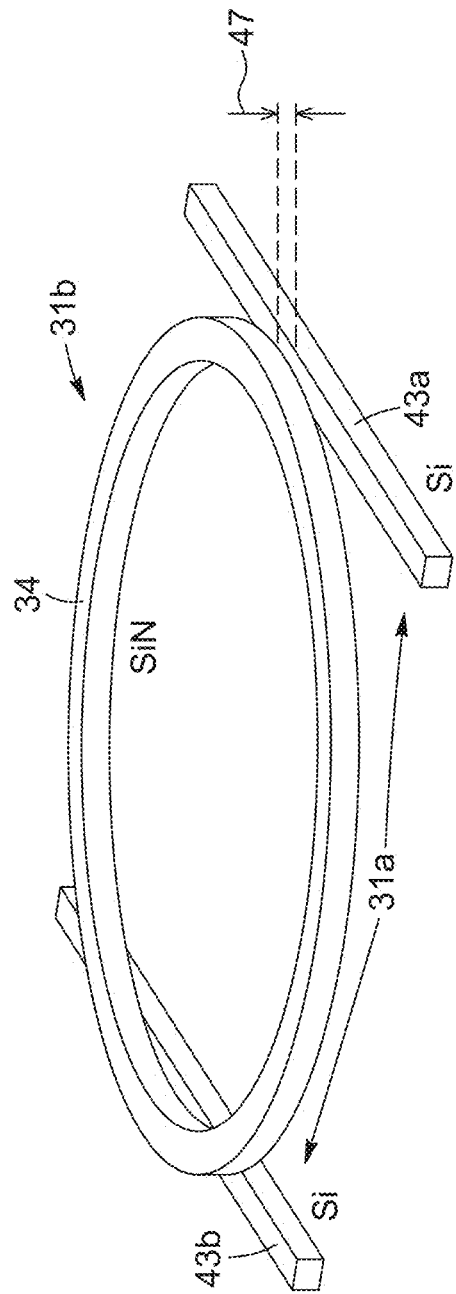
FIG. 3A is an elevation view of a MRR in a SiN functional layer and associated waveguide branches in a Si functional layer.

As mentioned above, the vertical interlayer transitions for transferring light between MMRs can be performed using optical vias, such as adiabatic tapers. The expression "optical via" may be understood to refer to any device or structure allowing the transfer of light between different functional layers, by analogy to the use of electrical vias in electronic chip design. In some implementations, such as shown in FIG. 2B, the optical via 44 may be embodied by a SiN—Si dual-layer transition such as shown in FIG. 6 of Wang, Pengfei et al, "Design and fabrication of a SiN—Si optical phased array chip", Photonic Research, Vol. 8, Issue 6, pp 912-919 (2020), the entire contents of which is incorporated herein by reference. In other implementations, light coupling between different functional layers may be accomplished without using the typical optical via by directly coupling light vertically. For example, referring to FIG. 3A, there is shown an embodiment wherein a SiN functional layer 31b, in which is formed a SiN ring defining an MRR 34, is stacked on top of a Si functional layer 31a, in which are formed first and second Si-layer waveguide branches 43a, 43b. In this variant, the Si-layer waveguide branches 43a, 43b are directly optically coupled with the SiN ring 34 located in the upper layer 31b. The coupling strength k is engineered through adjusting a gap 47 between the Si and SiN functional layers 31a, 31b, through the Si waveguide branches 43a, 43b. Light from the first Si-layer waveguide branch 43a is coupled into the SiN MRR 34, resonates in the ring and is coupled to the second Si-layer waveguide branch 43b back in the bottom layer. Another embodiment of light coupling between a waveguide and a MRR in two different materials is for example shown in Li, Xin, et al., "Ultra-low-loss multi-layer 8×8 microring optical switch", Photonics Research, Vol. 11, Issue 5, pp. 712-723 (2023), the entire contents of which is incorporated herein by reference.

It will be readily understood that the coupling of light between the different functional layers may be performed in other manners. By way of example, in the hybrid configuration of FIG. 2D, one or more optical edge couplers or grating couplers allowing light to travel between the functional layers of the first and second reflector chips 30a, 30b may be provided.

In accordance with one aspect, and as mentioned above, the first and second MRRs 34 and 36 may be made of different materials. In the embodiment of FIGS. 2A to 2C, the first MRR 34 is made of Si whereas the second MRR 36 is made of SiN. The reflector chip therefore includes an Si functional layer and a SiN functional layer hosting the respective MRRs. The first and second MRRs 34 and 36 preferably form ring-shaped waveguide having different radii $R_i$ and different effective indices $n_{\mathit{eff}i}$ and group indices $n_{gi}$ determined by the material and waveguide structure of the corresponding functional layer 31a, 31b. Note that the MRRs do not need to be perfectly circular; they can have any closed-loop shape whose circumference satisfies a target radius, i.e., $L_i=2\pi R_i$. Each MRR supports the propagation of light at resonant optical frequencies (i.e. wavelengths) determined by the corresponding radius $R_i$ and group index $n_{gi}$. As known in the art, the spacing between resonant optical frequencies of each MRR defines the corresponding free spectral range of this MRR, given by $FSR_i=\lambda^2/2\pi n_{gi} R_i$.

The first and second MRR 34 and 36 are disposed in a Vernier configuration. As explained above, the Vernier FSR ($FSR_V$) of a pair of MRRs is based on the individual FSRs of both MRRs (see eq. (1)) and sets the range for the wavelength tuning of an ECL. In the context of an ECL based on MRRs provided in two different materials, their group index difference has an impact on the considerations above. In some implementations, the first and second MRRs having different radii selected in view of their corresponding group indices. In one embodiment, the radii of the MRRs may be proportional to the ratio of their group indices. For example, for the SiN-on-Si platform, the radii of the MRRs can be approximately related as:

$$R_{Si} \approx \frac{(m-1)}{m} \frac{n_{gSiN}}{n_{gSi}} R_{SiN}, \quad (3)$$

which leads to a Vernier FSR of:

$$FSR_V \approx \frac{FSR_{SiN} \times FSR_{Si}}{|FSR_{SiN} - FSR_{Si}|} \approx \frac{\lambda^2}{2\pi |n_{gSi} R_{Si} - n_{gSiN} R_{SiN}|} \quad (4)$$

where $R_{Si}$, $R_{SiN}$ are the MRR radii and $n_{g\_Si}$, $n_{g\_SiN}$ are the group indices of the Si and SiN waveguides, respectively.

Restating equation (3) and applying it to unspecified different materials, the ratio of the radii of the first and second MRRs may, in some variants, substantially corresponds to:

$$\frac{R_2}{R_1} \approx \frac{(m-1)}{m} \frac{n_{g1}}{n_{g2}}, \quad (3')$$

wherein $R_1$ is the radius of the first MRR, $R_2$ is the radius of the second MRR, $n_{g1}$ is the group index of the material of the first MRR, $n_{g2}$ is the group index of the material of the second MRR, and m is a tuning enhancement factor.

Restating equation (3) and applying it to unspecified different materials, the ratio of the radii of the first and the remaining MRRs, which could be more than 1, may, in some variants, substantially corresponds to:

$$R_{i+1} \approx \frac{m_{i+1}}{m_1} \frac{n_{g1}}{n_{g_{i+1}}} R_1 \quad (3'')$$

where $i = 1, 2, 3, ...$ wherein $R_1$ is the radius of the first MRR, $R_{i+1}$ is the radius of the $(i+1)^{th}$ MRR, $n_{g1}$ is the group index of the material of the first MRR, $n_{g(i+1)}$ is the group index of the material of the $(i+1)^{th}$ MRR, and $m_1$ and other resonant numbers of corresponding MRRs ($m_{i+1}$) are co-prime numbers.

Referring to FIG. 4A, there is shown the group indices of Si and SiN waveguides with respect to wavelength, which are calculated using a standard Mode-Solver. The group index of a strip Si waveguide is approximately 2 times that of SiN, which in turn determines the respective MRR radii, for example using eq (3) above. FIG. 4B presents an example of the Vernier FSR change, i.e., the wavelength tuning range change, against $R_{Si}$ for a fixed $R_{SiN}$ value of 115 µm. The estimated Si radius is found to be near $$R_{Si\_est} \approx \frac{R_{SiN}}{2} \approx 57.5 \text{ µm}$$

(assuming a large m such that $$\frac{(m-1)}{m} \approx 1).$$

The cross-coupling coefficients for this simulation are $\kappa_{Si}=\kappa_{SiN}=0.23$ and waveguide losses Si and SiN are 2 dB/cm and 0.1 dB/cm, respectively. The tuning range exhibits a vertical asymptote at $R_{Si}=R_{Si\_est}$, i.e., $FSR_V$ approaches infinity as $R_{Si}$ approaches $R_{Si\_est}$ from both sides. However, $R_{Si\_est}$ does not necessarily represent the optimal point for $R_{Si}$, as the SMSR of the feedback circuit should also be considered. As depicted in FIG. 4B, Vernier SMSR tends towards zero as $R_{Si}$ approaches $R_{Si\_est}$ and occurs when all transmittance resonances of both MRRs align with one another. For the Vernier SMSR calculation, we calculate the height of the first neighboring mode to the fundamental mode. An $R_{Si}$ value that maximizes or optimizes both $FSR_V$ and Vernier SMSR may be selected. Different design factors may be considered. By way of example, for a stable laser operation, maintaining a Vernier SMSR above 3-5 dB could be a requirement in the ECL feedback circuit design. Consequently, it may be preferable to choose an $R_{Si}$ value for which the SMSR may exceed 3 dB. In another example, the selection of the radii of the MRRs may aim to ensure that a suitable balance is achieved between high $FSR_V$ values and an acceptable value for Vernier SMSR. FIG. 4C shows the simulated reflection spectrum of a tunable cavity reflector in which the radius of the Si MRR was selected based on the graph of FIG. 4B (with $R_{SiN}$=115 µm) in order to achieve an SMSR of 10 dB, leading to selecting $R_{Si}$≈55 µm. As shown in the simulated spectrum, this selection yields a tuning range of approximately 50 nm. The peak height at the common resonance indicates the loss which occurs during propagation through the pair of MRRs. In the present example, a value of $T_{IL}$≈1.3 dB is obtained.

In some implementations, the radii of the MRRs are chosen to be large enough to neglect the bending loss and small enough to minimize waveguide losses. Once the radius of one of the MRRs is fixed, the other may be estimated using Eq. (3). As discussed above, in the example of FIGS. 4A to 4C the SiN MRR radius was first set to be large enough to neglect bending losses ($R_{SiN}$=115 µm), and then the Si MRR radius was calculated from Eq. (3), ($R_{Si}$≈55 µm). However, the bending losses for Si strip waveguides are typically negligible for MRR radius sizes greater than approximately 10-30 µm. As a result, selecting an overly large value for $R_{Si}$ may contribute to additional waveguide losses without providing additional benefits with respect to bending losses. The situation may worsen if a larger SiN MRR radius is needed or if a material with a lower index than SiN is used, resulting in an even larger Si MRR radius. To address these issues, in some embodiments a modified version of the multi-material Vernier MRR design may be used. With careful design, this modified approach could also provide additional advantage. The modified Vernier FSR for dual MRR of SiN-on-Si platform is given by:

$$FSR_V \approx \frac{(FSR_{SiN} \times FSR_{Si})}{|N \times FSR_{SiN} - FSR_{Si}|} \approx \frac{\lambda^2}{2\pi |N \times n_{gSi} R_{Si} - n_{gSiN} R_{SiN}|} \quad (5)$$

where N is the Si MRR reduction factor respect to Eq. 3. With the modified form, the radii of the MRRs can be approximately related as $$R_{Si} \approx \frac{(m-1)}{N \times m} \frac{n_{gSiN}}{n_{gSi}} R_{SiN} \quad (6)$$

Hence, in some embodiments, the ratio of the radii of the first and second MRRs may, in some variants, substantially corresponds to:

$$\frac{R_2}{R_1} \approx \frac{(m-1)}{N \times m} \frac{n_{g1}}{n_{g2}}, \quad (6')$$

wherein $R_1$ is the radius of the first MRR, $R_2$ is the radius of the second MRR, $n_{g1}$ is the group index of the material of the first MRR, $n_{g2}$ is the group index of the material of the second MRR, m is a tuning enhancement factor and N is a reduction factor associate with the material of the first MRR.

Referring back to FIGS. 2A to 2C, the ECL 20 further includes a tuning mechanism for tuning the spectral response of at least one of the first and second MRRs 34, 36, or both. In some implementations, the thermo-optic (TO) effect is used for tuning and switching between adjacent and non-adjacent wavelength channels. The tuning mechanism may for example include heaters 50 placed above each MRR 34, 36, to tune their individual resonances. As best seen on FIGS. 2B and 2C, in the illustrated embodiment each heater 50 includes a metallic heat resistor 52 through which a current is passed to create heat in the resistor, whose temperature modifies the index of semiconductor materials. Metals can be used as heaters which should have a higher resistivity than the Cu and Al which typically is used for routing/pads and metallization. TiN, tungsten (W) lines above the waveguide are typically used. In the illustrated implementation the metallic heat resistor 52 is for example embodied by a TiN arch extending within the cladding 62 over a section of the associated MRR having an arched shape matching the portion of the MRR ring underneath. Metal electrodes 54 are provided over the cladding 62 of the reflector chip and are connected to extremities of the TiN arch 52. Metal vias 56 may provide the electrical connection between the electrodes 54 and the TiN arches 52. The heaters can either be controlled together for continuous wavelength tuning within a single MRR's FSR, or controlled individually for discrete wavelength tuning, stepping by a single MRR's FSR.

Figure 3B:
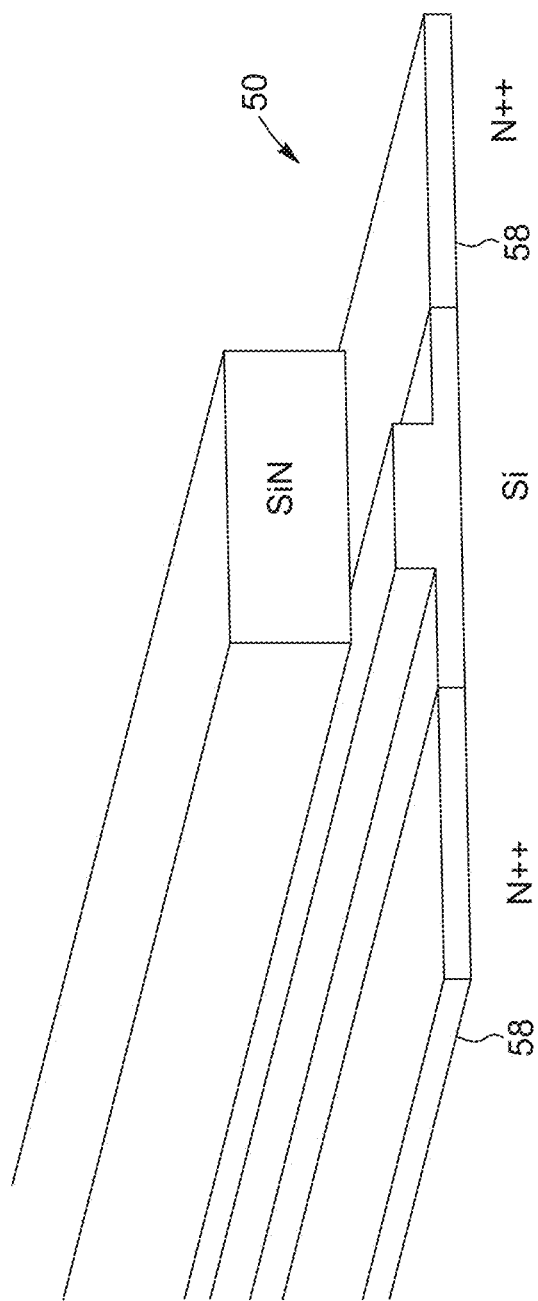
FIG. 3B is a side elevation view of a heater including doped elements.

Referring to FIG. 3B, in some implementations the heaters 50 may include N or P-doped silicon elements 58 to change the refractive index of Si or SiN waveguide. Having a shorter distance between the heater and waveguide may increase the temperature of the MRR waveguide and subsequently change its refractive index while requiring a lower electrical power than metal electrodes. Similarly to metallic heaters, Si-based heater can be biased to create heat and cause a refractive index change in the close-by waveguide through the thermo-optics effect. The Si-doped heater may be positioned next to the MRR waveguide or in implementations, the MRR waveguide itself may act as the resistor. Other schemes using the thermo-optic effect to change the index of the MRR waveguide may also be used.

Variants of ECL Configurations

Figure 5A:
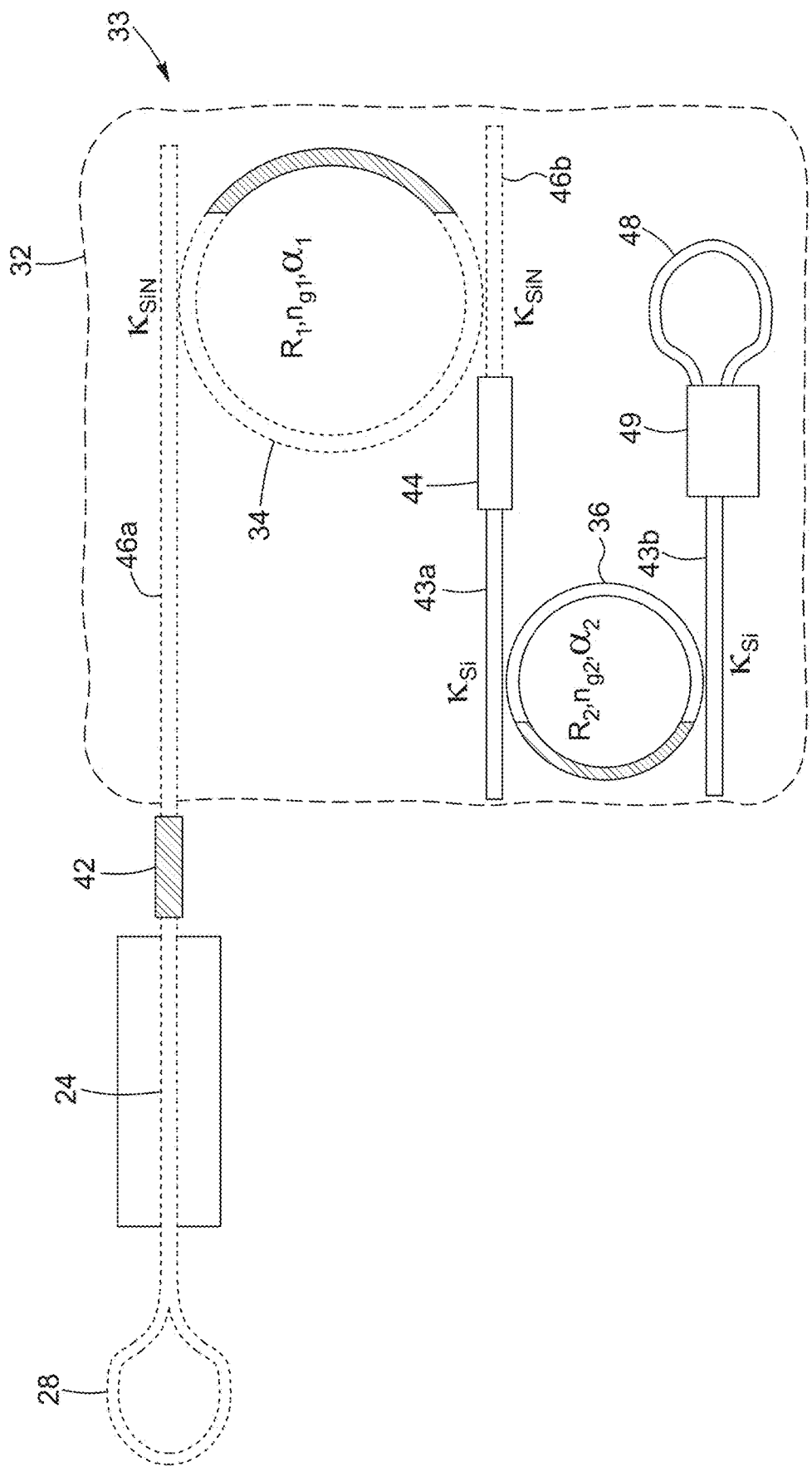
FIGS. 5A and 5B and are respectively a schematic representation and a side elevation view in partial transparency of an ECL configuration according to one embodiment.
Figure 5B:
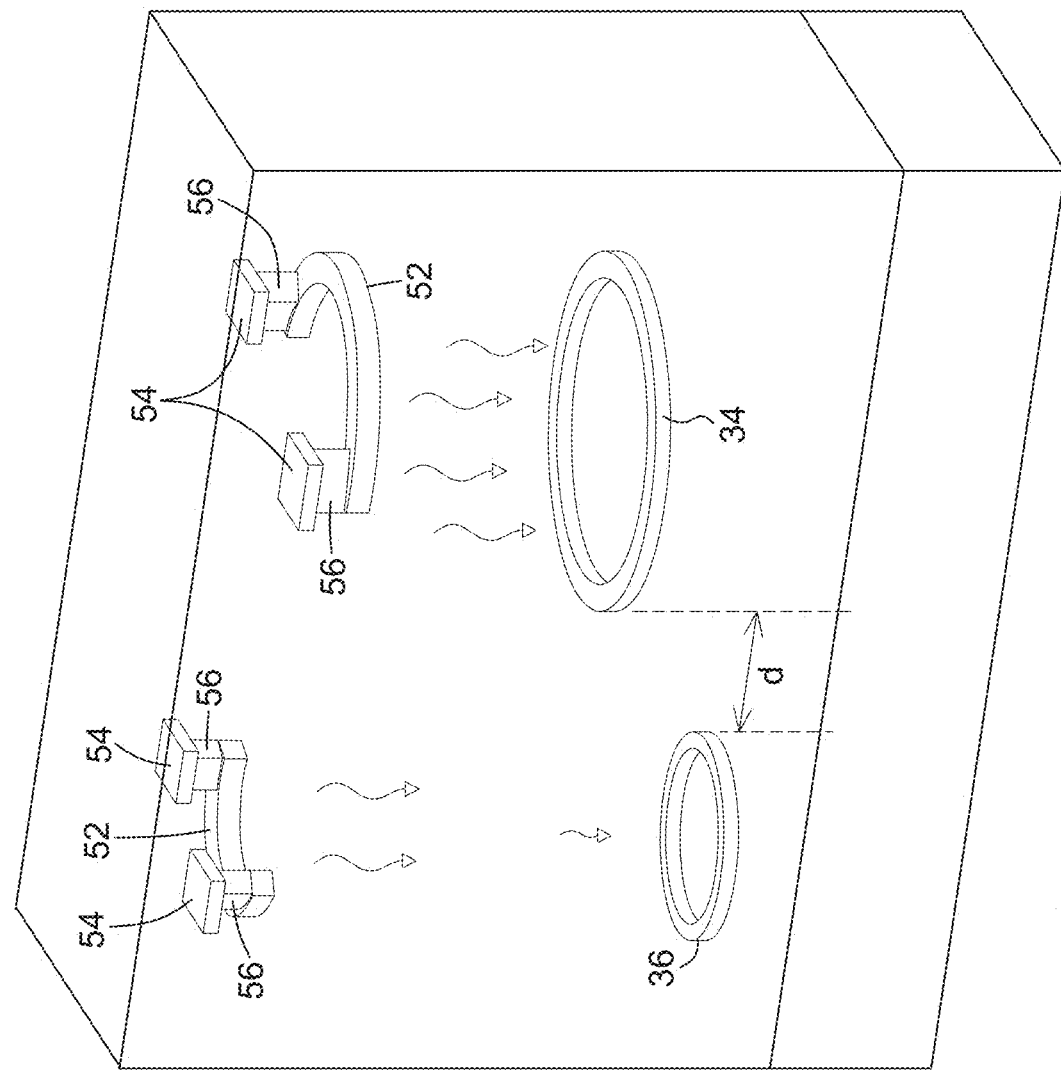

Referring to FIGS. 5A and 5B, there is shown a variant of the ECL configuration of FIG. 2A in which a separate loop mirror 48 is used to close the loop formed by the tunable cavity resonator 32. In this configuration, the waveguide structure 33 of the tunable cavity reflector 32 includes a first SiN layer waveguide branch 46a optically coupled to the gain waveguide 24. No coupler is required and the entrance of the tunable cavity reflector 32 in this variant. A phase shifter 42 is used to tune the cavity modes. The waveguide structure 33 further includes the first MRR 34 provided in the SiN functional layer, to which is coupled a second SiN-layer waveguide branch 46b opposite the first SiN-layer waveguide branch 46a. An optical via 44 optically couples the second SiN-layer waveguide branch 46b, in the SiN functional layer, to a first Si-layer waveguide branch 43a, in the Si functional layer. The second MRR 36, provided in the Si functional layer, is optical coupled to the first Si-layer waveguide branch 43a and to a second Si-Layer waveguide branch 43b, optically coupled to the loop mirror 48 through an optical coupler 49.

In this configuration, light entering the tunable cavity reflector 32 first travels into the first SiN waveguide branch 46a, from which it is directly coupled into the first MRR 34. It can then travel from the first MRR 34 to the second SiN-layer waveguide branch 46b, through the optical via 44 to the first Si-layer waveguide branch 43a, from which it can enter the second MRR 36. From the second MRR light travels to the second Si-Layer waveguide branch 43b into the loop mirror 48 through the coupler 49. Light is then reflected back through the same path in reverse, until it exits the tunable cavity reflector 32 through the first SiN waveguide branch 46a.

It will be noted that in the illustrated example of FIG. 5A the fixed cavity mirror 28 is also embodied by a Sagnac loop mirror, although in other variants a ROSA design may also be used.

Figure 6A:
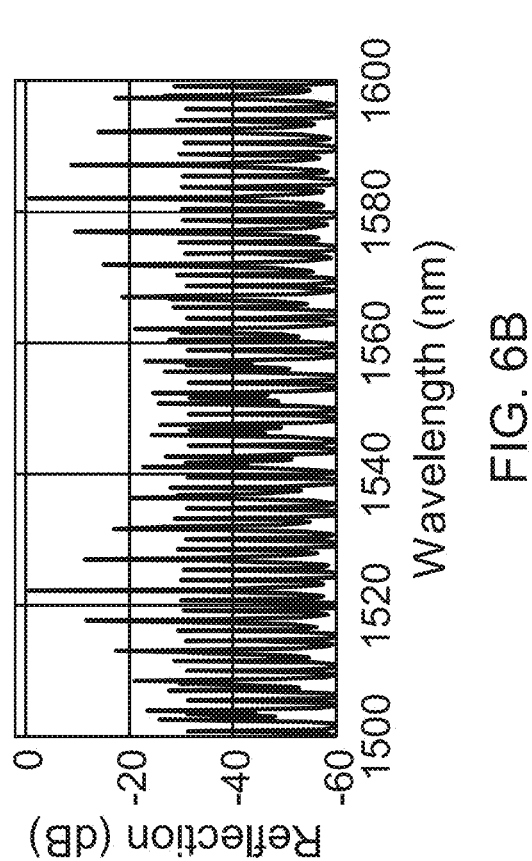
FIGS. 6A to 6E are graphs respectively showing: the Vernier FSR and SMSR vs. $R_{Si}$ for a fixed $R_{SiN} \approx 115$ μm, and N=3 for $\kappa_{Si}=0.23$ (FIG. 6A, and for $\kappa_{Si}=0.2$ (FIG. 6C); the simulated transmission spectra of the hybrid Si—SiN mirrors for $\kappa_{Si}=0.23$ (FIG. 6B) and $\kappa_{Si}=0.2$ (FIG. 6D); the ECL linewidth as a function of detuning for different combinations of N, $\kappa_{Si}$ and $\kappa_{SiN}$.
Figure 6B:
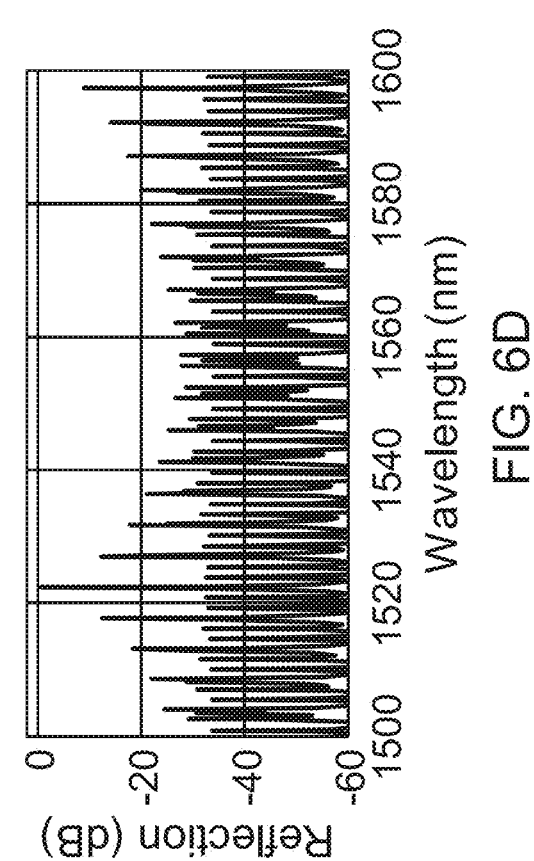
Figure 6C:
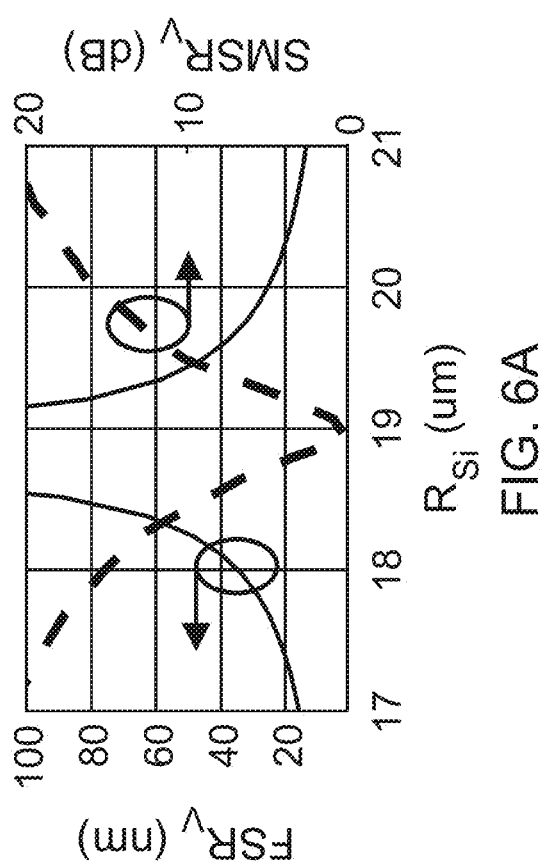
Figure 6D:
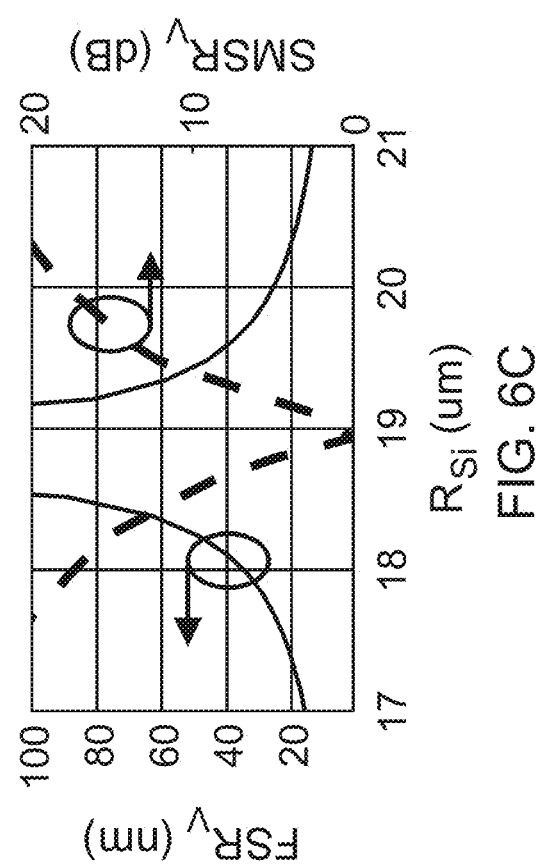
Figure 6E:
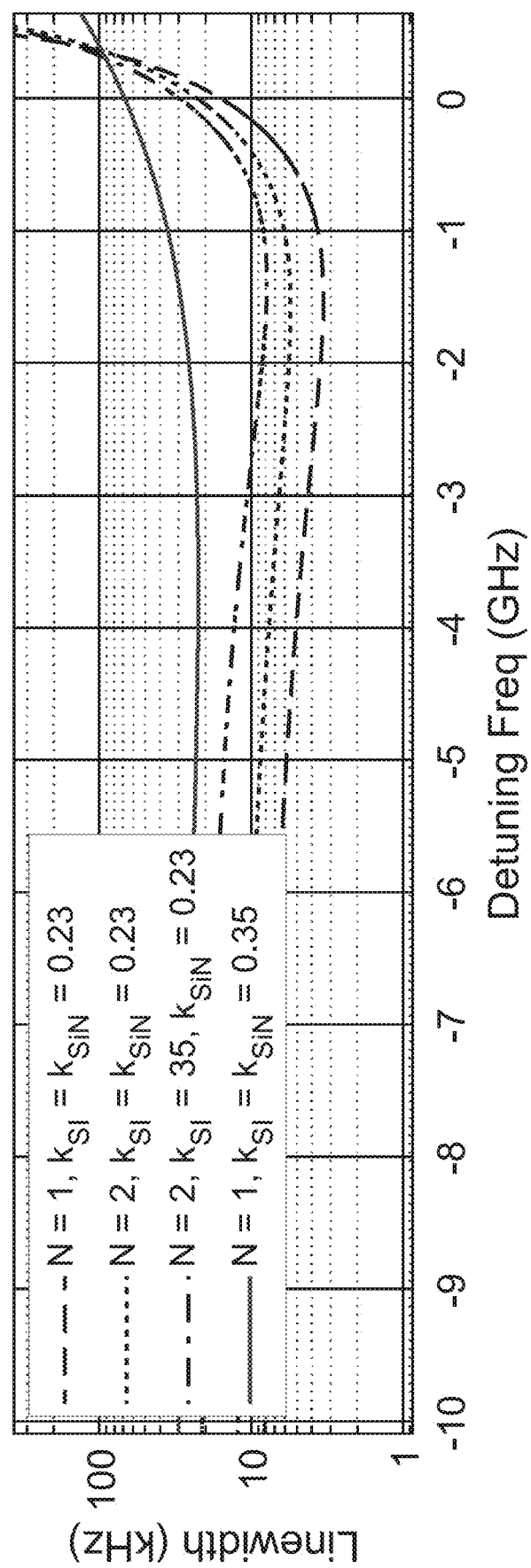

FIG. 6A presents an example of the Vernier FSR and SMSR change against $R_{Si}$ for a fixed $R_{SiN}$ value of 115 µm, as simulated for an ECL configuration such as shown in FIG. 2A, using Si and SiN as the materials of the functional layers hosting the first and second MRRs. The cross-coupling coefficients are $\kappa_{SiN}=\kappa_{Si}=0.23$. Using equation (6) above with N=3, the estimated Si radius was determined to be near $$R_{Si} \approx \frac{R_{SiN}}{3 \times 2} \approx 19.2 \text{ µm,}$$

which is about 6 times smaller than that of SiN MRR. A smaller Si radius may improve the thermal isolation between SiN and Si MRR waveguides when they are stacked on top of each other, as depicted in FIG. 2B. The Vernier FSR and Vernier SMSR closely follow the same pattern as when N=1 (FIG. 4B). For the Vernier SMSR calculation, the height of the third neighboring mode is calculated, as the first two neighboring modes are entirely distinguished by the Si MRR, given that $FSR_{Si} \approx N \times FSR_{SiN}$. FIG. 6B shows the simulated transmission spectrum of the tunable reflector, aiming to achieve an SMSR of ~10 dB, which results in a wavelength tuning range of approximately 60 nm for $R_{Si} \approx 18.4$ µm. The wavelength tuning range may further be optimized by keeping $\kappa_{SiN}=0.23$ and decreasing $\kappa_{Si}$ to 0.2. FIG. 6C displays the resulting change in Vernier SMSR with respect to the Si MRR radius, while the Vernier FSR remains unchanged. However, in this scenario, in order to achieve an SMSR of 10 dB, the Vernier FSR can be increased up to 85 nm, as demonstrated in FIG. 6D. It can be inferred that employing multiple materials in the design of MRR-based ECLs offers a broader range of parameters for optimizing all laser merits, as also will be shown next.

The ECL linewidth was estimated based the equations and the characteristics of the RSOA used in Tran, M. A. et al. "Ring-resonator based widely-tunable narrow-linewidth Si/InP integrated lasers", IEEE J. Sel. Top. Quantum Electron. 26, 1-14 (2020) (hereinafter Tran et la). To accomplish this, the methodology described in Tran et la was followed. Assuming a chip-to-chip coupling of 2 dB and waveguide losses mentioned above, we estimate the linewidth for the Si—SiN ECL feedback circuit. For N=1 and for cross-coupling coefficients values of $\kappa_{SiN}=\kappa_{Si}=0.23$, we observe a linewidth of around 3.3 kHz at a 1.4 GHz detuning. Decreasing the Si MRR radius for N=2 leads to a reduction in the Q factor of Si MRR, and the linewidth only increases to 5.5 kHz. In this scenario, further reducing the Si MRR Q factor by increasing the cross-coupling coefficient to $\kappa_{Si}=0.35$ causes a slight increase of the linewidth to 7.8 kHz. However, if we also increase the cross-coupling coefficient of SiN to $\kappa_{SiN}=0.35$, the linewidth increases to 22 kHz, indicating the dominant influence of the SiN MRR on the linewidth value. Further optimization can be carried out to minimize the linewidth even more.

In order to maximize the output power, the multi-material ECL may still face limitations due to its reliance on the Si MRR. However, within this ECL, it is possible to partially decouple the ECL parameters from one another, allowing each MRR to contribute for optimizing a specific parameter of the ECL. Consequently, the first target may be on enhancing the ECL performance as much as possible using the SiN MRR. By doing so, the demands on the Si MRR can be reduced, enabling an increase in output power through various techniques as outlined below.

Increasing the optical power in the Si MRR waveguide leads to nonlinear losses due to two-photon absorption (TPA) and subsequent free-carrier absorption (FCA). To quantify these effects and the impact of techniques to increase the output power, at least approximately, we perform a quantitative estimation based on the approach reported in Xu, Yilin, et al. "Hybrid external-cavity lasers (ECL) using photonic wire bonds as coupling elements." Scientific reports 11.1 (2021): 16426, (hereinafter Xu et al). The maximum output power can be estimated based on the two parameters $P_{max}$ (dBm)≈NL (dBm)−M (dB), where NL is the nonlinear threshold of a straight Si waveguide with a length equivalent to the feedback circuit ($L_{equ}$) and with the same waveguide cross section (here it is 500 nm×220 nm), and M is the power enhancement factor in the MRR as compared to the power in the corresponding bus waveguide which can be defined as:

$$M = \frac{(1-t^2)}{(1-t^2\alpha)^2} + \frac{(1-t^2)^3}{(1-t^2\alpha)^4}. \tag{7}$$

where t is the self-coupling coefficient and a is the single-pass amplitude transmission. The first term in eq. (7) is light enhancement for the portion of light that enters the MRR counterclockwise. The second term of the above equation is light enhancement for the portion that enters the target MRR clockwise, after passing the other MRR. Here, we assume that the RSOA can provide enough power after the coupling and feedback circuit losses that the output power is primarily limited by the nonlinear threshold. Xu et al reports exhibiting signs of nonlinear losses such as TPA and TPA-FCA for on-chip powers of approximately NL≈19 dBm (80 mW). Therefore, with $\kappa=0.23$ ($t=\sqrt{1-\kappa^2}\approx0.973$), $\alpha\approx0.994$, and M≈14.4 dB, the maximum power is estimated and shown to be around $P_{max}$ (dBm)≈4.6 dBm.

In some implementations, to increase the output power in the ECL, either one or both of the following strategies may be employed: reducing the power enhancement factor M of the Si MRR, and/or increasing the nonlinear threshold NL. Here, we present several approaches that align with these two strategies. In the first, more intuitive approach, leveraging the low nonlinearity of SiN, we could decrease $\kappa_{SiN}$ which would elevate M of the SiN MRR, thereby maintaining a low linewidth for the ECL. Simultaneously, we can sufficiently increase $\kappa_{Si}$ to reduce M of the Si MRR. Nevertheless, we can not increase $\kappa_{Si}$ unbounded as it will reduce SMSR and consequently the wavelength tuning range. To establish a benchmark point to see the impact of following techniques, we use the parameters from the example FIGS. 6A and 6B (with $\kappa_{Si}=\kappa_{SiN}=0.23$). The maximum power is indeed obtained to be around $P_{max}$ (dBm)≈4.6 dBm, similar to that of Xu et al, given the same $L_{equ}$ and then NL. This setting also provides an SMSR≈10 dB and a linewidth of ~5.5 kHz. Modifying $\kappa_{Si}=0.4$ and $\kappa_{SiN}=0.15$ elevates the maximum power by 3.9 dB, i.e., $P_{max}$ (dBm) ≈8.5 dBm, while providing an SMSR≈3.3 dB, and a linewidth of ~2 kHz. Further optimization may be required to find the optimum point.

Figure 7B:
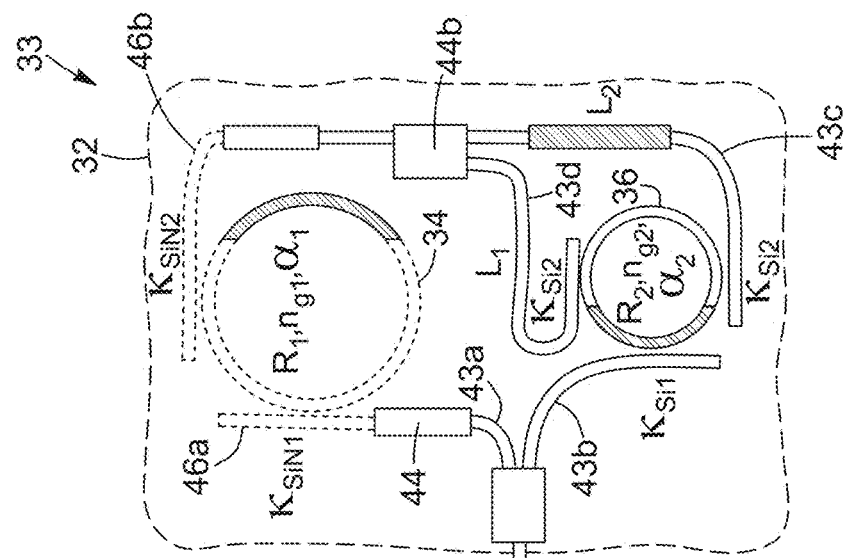
FIG. 7B is a schematic representation of Si—SiN MRRs within a loop mirror and two-output waveguide branches from the Si MRR are combined before connecting to SiN MRR.
Figure 7A:
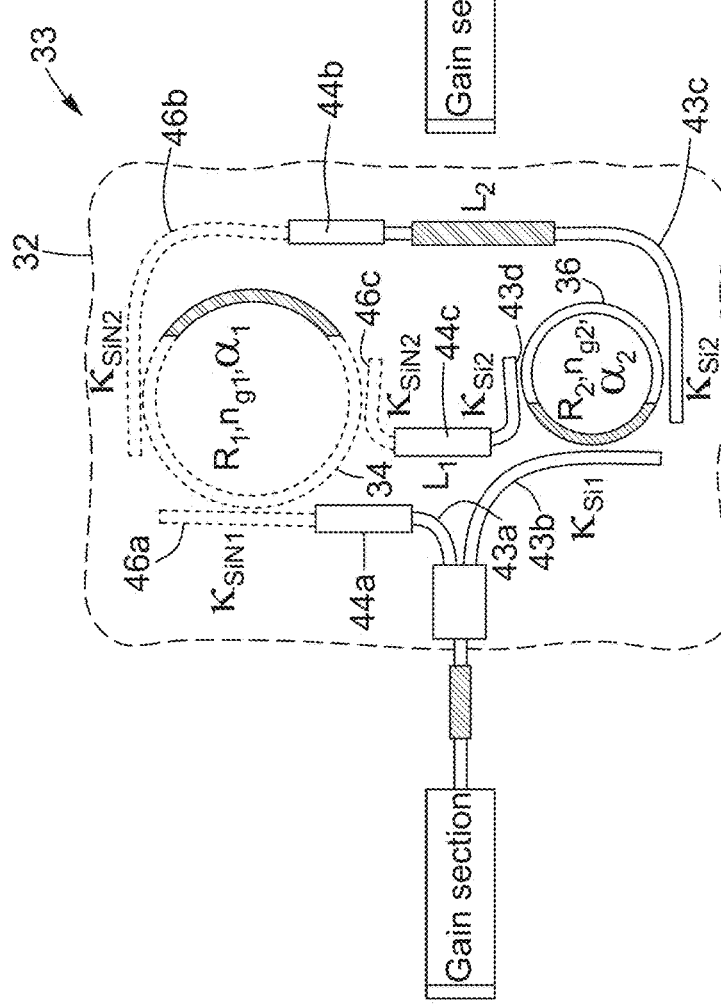
FIG. 7A is a schematic representation of Si—SiN MRRs within a loop mirror and connected to each other by two waveguide branches.

In the second approach, a feedback circuit design such as shown in FIG. 7A may be used. In this design, to close the feedback loop, the two MRRs 34, 36 are connected to each other through more than one waveguide branches. In the variant of FIG. 7A, the waveguide structure 33 of the tunable cavity mirror 32 is similar to the example of FIG. 2A, and includes first, second and third Si-layer waveguide branches 43a, 43b and 43c, first and second SiN-layer waveguide branches 46a and 46b, and first and second optical vias 44a and 44b coupling light between the Si and SiN functional layers, all forming a feedback circuit similar to that of FIG. 2A. A supplemental optical via 44c is additionally provided between the first and second MRRs 34, 36 and is coupled thereto through a fourth Si-layer waveguide branch 43d and a third SiN layer waveguide branch 46c. When considering each MRR 34 and 36 as a temporary storage element for optical power, filled by the input waveguide branch bringing light from the RSOA (e.g. the first SiN-layer waveguide branch 46a and the second Si-layer waveguide branch 43b in the configuration of FIG. 7A), adding more output waveguide branches at the MRR output port can be seen as providing additional pathways for the optical power to exit the tunable cavity reflector 42, which may result in reducing M for Si.

The power enhancement factor in Eq. 7 can be adapted to account for the number of output waveguides (p) draining optical power from the Si MRR, as $$M_{Si} = \frac{(1-t_{Si1}^2)}{(1-t_{Si1}t_{Si2}^p\alpha_{Si})^2} + \frac{p^2(1-t_{SiN1}^2)(1-t_{SiN2}^2)(1-t_{Si2}^2)}{(1-a_{SiN}t_{SiN1}t_{SiN2}^p)^2(1-a_{Si}t_{Si1}t_{Si2}^p)^2}. \quad (8)$$

where $t_{Si1}$ and $t_{SiN1}$ are self-coupling coefficients of the input waveguide branches to Si and SiN MRRs, respectively. $t_{Si2}$ and $t_{SiN2}$ are the self coupling coefficients of the output waveguide branches associated with the Si and SiN MRRs, here embodied by the third and fourth Si-layer waveguide branches 43c and 43d. This equation can be written more generalized the cases that each output waveguide branch has a different coupling coefficient. For a two output waveguide branches case p=2, as shown in FIG. 7A, with $K_{Si1}$=0.25, $K_{Si2}$=0.3, and $K_{SiN1}$=0.15, $K_{SiN2}$=0.2, we can reduces $M_{Si}$ and increase the maximum output power to $P_{max}$≈9.5 dBm, providing also an SMSR≈3 dB and a linewidth of ~14 kHz. Additionally, in this example, by appropriately adjusting $\Delta L=L2-L1$, where L1 and L2 are the waveguide lengths of two branches. There is a phase shifter in the L2 path using which we can generate an interferometric effect between the two paths, which would yield an FSR that is twice $FSR_V$, thereby allowing us to double the tuning range, as shown in FIGS. 8A and 8B.

Figure 7C:
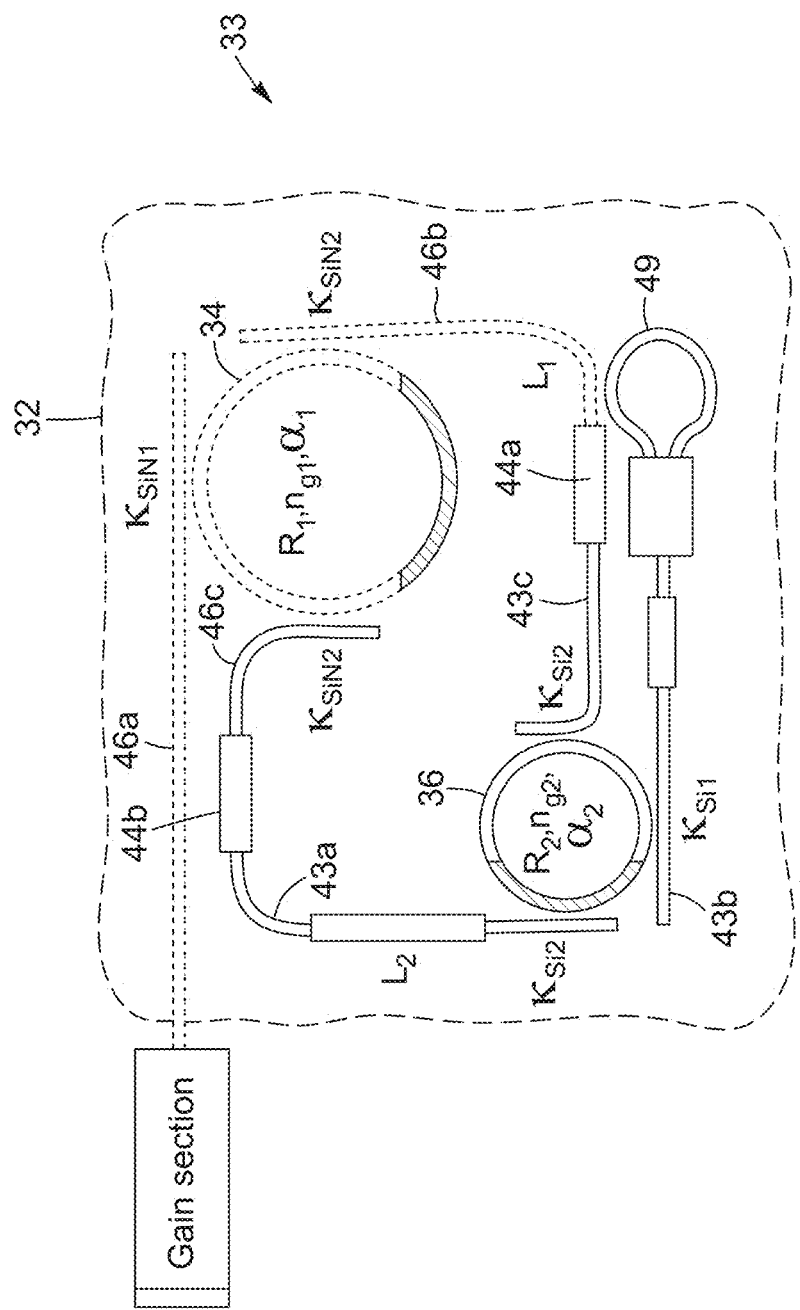
FIG. 7C is a schematic representation of Si—SiN MRRs connected to each other by two waveguide branches and separated from a loop mirror.

We can also implement the same principle in different embodiments, as two examples are shown in FIGS. 7B and 7C. By way of example, the embodiment of FIG. 7B differs from that of FIG. 2A by the addition of a fourth Si-layer waveguide branch 43d connecting to second MRR 36 from the third Si-Layer waveguide branch 43c, using a coupler 40'. In the embodiment of FIG. 7C, similar to that of FIG. 5A, the first and second MRRs 34, 36 are connected to each other by dual sets of waveguide branches 43a, 43b and 46b, 46c linked by optical vias 44a, 44b.

Figure 9:
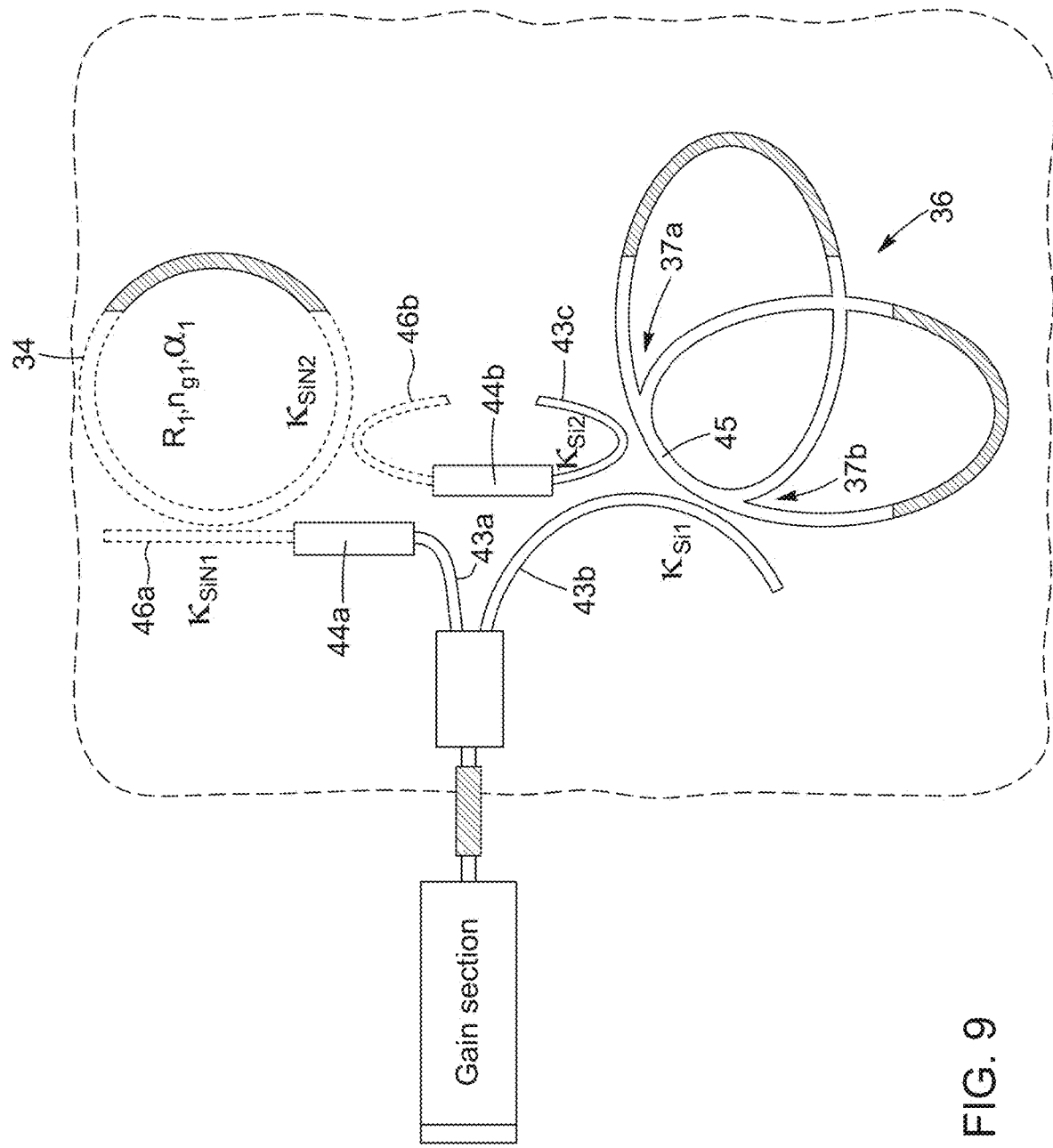
FIG. 9 is a schematic representation of a ECL configuration using interconnected Si MRR ring components.

Referring to FIGS. 9A and 9B, there is shown another example of ECL configuration which, in some implementations, may increase both the output power limit and the tuning range over more than 100 nm while achieving close to 10 kHz linewidth. In the ECL configuration of FIG. 9A, the second MRR includes two rings components 36a, 36b where a portion of both ring components 36a, 36b is used to separate light along two different paths using two y-branches 37a, 37b and one waveguide crossing 45. This configuration may lower down the light intensity in the rings, leading to a reduced nonlinearity. In addition, phase tuners placed at each branch not only are used to tune the ring resonating wavelength, but also their combination is used as a Mach-Zehnder interferometer in the ring to suppress the next resonating modes and increase the wavelength tunability range.

Figures 10A, 10B:
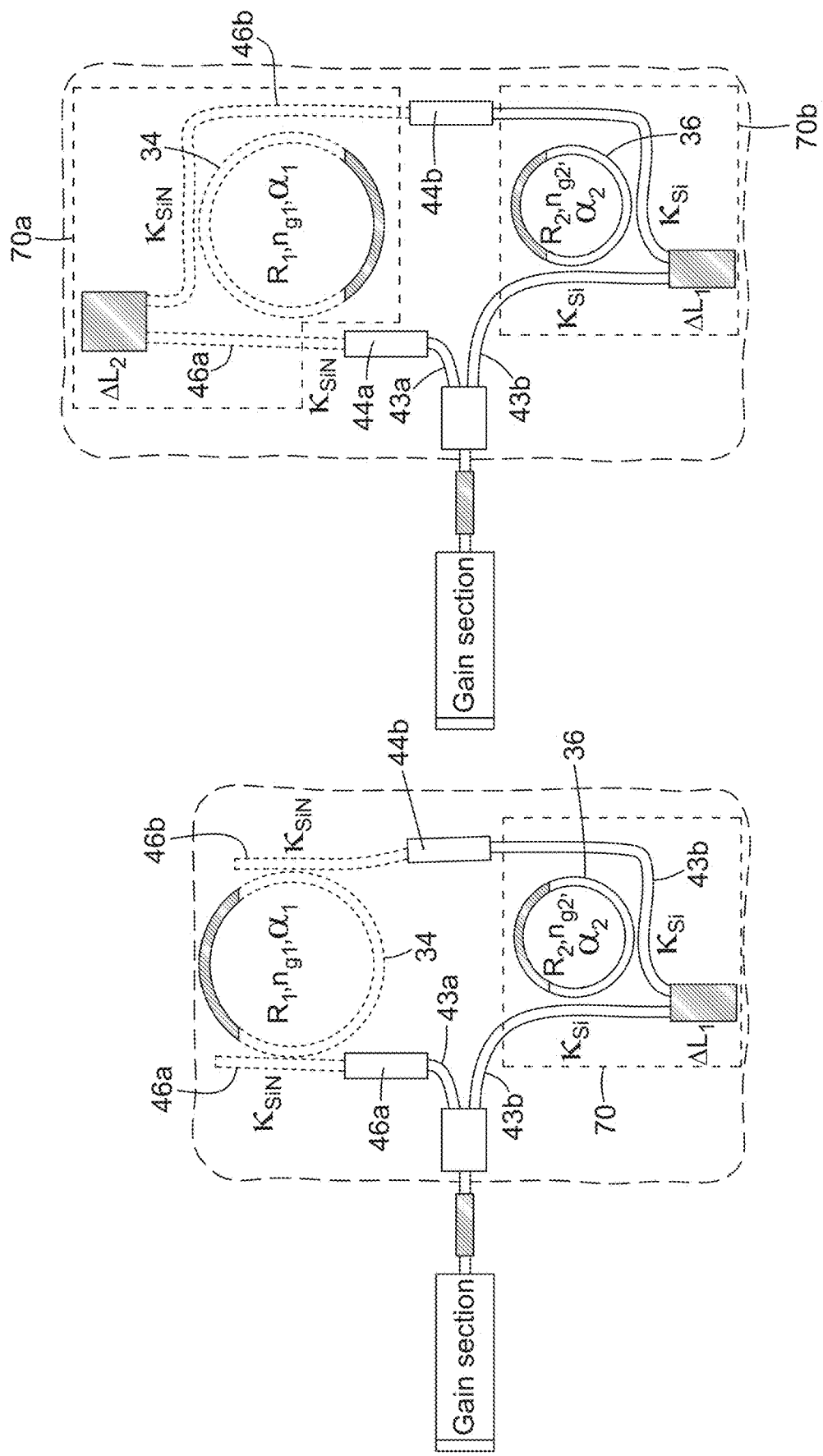
FIGS. 10A and 10b are schematic representations of ECL configurations with an MZI-integrated Si MRR (FIG. 10A), and two MZI-integrated Si and SiN MRRs (FIG. 10B).

Referring to FIGS. 10A and 10B there is shown another tunable cavity design aimed at increasing the tuning range, reducing the Vernier SMSR, and elevating the output power limit. In this configuration, an MZI 70 is integrated with one of the MRRs, for example the second MRR 36 extending in the Si functional layer, such that the waveguide of the second MRR 36 serves as one of the MZI arms. A MZI configuration is formed when light is split by a coupler in two waveguides of DL=L2–L1 difference in length and they combine again using a coupler. The MZI 70 creates a periodic spectral response which could be used to engineer the overall spectral response of the Vernier configuration. For example, in FIG. 10A, the light in the Si waveguide branch 43b is split partially between the second (Si) MRR 36 and the segment of the Si waveguide branch 43b which passes DL1, and the combines with the light from the second MRR 36 in the coupler region again, creating an MZI. Optimizing $\kappa_{Si}$, $\kappa_{SiN}$, $\Delta L_1$ and $\Delta L_2$, we anticipate that the proposed MZI-integrated MRR structure can potentially lower the M value, while preserving a lower SMSR and enabling a larger tuning range. Note that the same designs can also be implement in single silicon material ECLs. FIG. 10B shown another example where MZIs 70a, 70b are created at both the first and second MRRs 34 and 36.

Figure 11B:
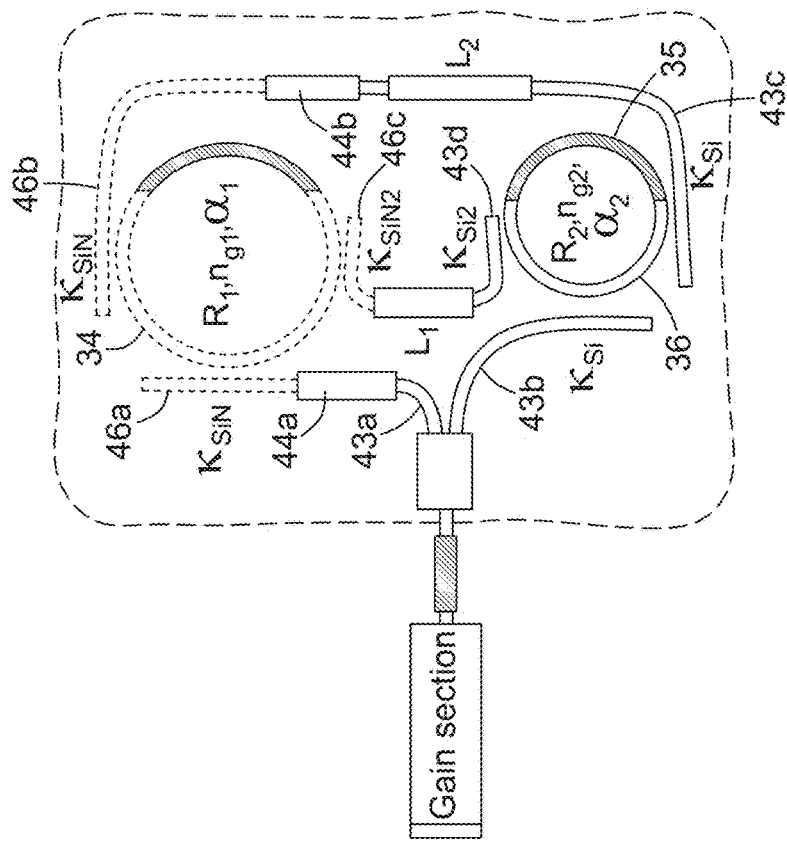
FIGS. 11A and 11B are schematic representations of ECL configurations including a MRR with a variable width section.
Figure 11A:
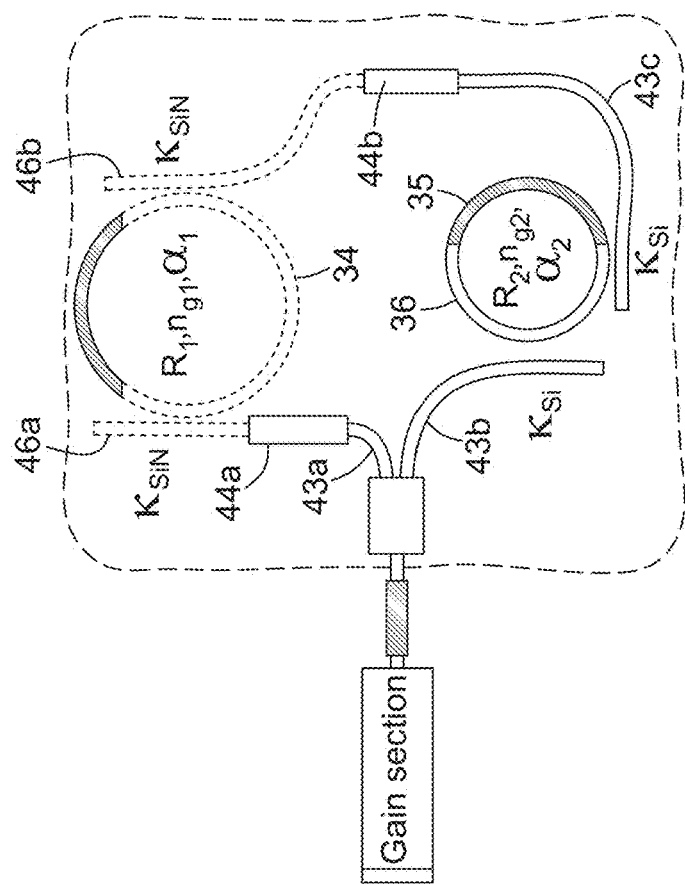

The second methodology to increase the output power level involves raising the nonlinear threshold NL, in accordance with $P_{max}$ (dBm)≈NL (dBm)–M (dB). Referring to FIGS. 11A and 11B, we can enhance the nonlinear threshold NL in the second (Si) MRR 36 by employing a second (Si) MRR having a variable width (W) section 35, i.e., increasing the effective Si waveguide cross-section. In the illustrated embodiment the variable-width section overlaps with the heater, which may be advantageously increases the interaction volume between the heater and the Si MRR, resulting in a higher efficiency for thermo-optic phase changes. It will however be understood that different arrangements may be considered. In this MRR structure, the cross-section area of the waveguide forming the second MRR ($A_{cs}$) is engineered to reduce the intensity of the light, without disturbing the single-mode coupling within the bus-to-MRR coupling region. The width of the second MRR 36 width is $W=W_0$ from an initial angle (IA=0°)—bus-to-MRR coupling region-up to the output angle (OA) where the light is coupled out of the waveguide forming the second MRR 36, for example in FIG. 11A, OA=IA+90° counterclockwise. $W_0$ is chosen such that it ensures single-mode coupling from the bus to the MRR and vice versa, in this example $W_0$=500 nm. Following OA, the width of the waveguide adiabatically expands to a maximum value of $W_{max}$, where the rate of width changes gradually plateaus. Subsequently, the width adiabatically decreases back to $W_0$ as it nears the initial angle IA. This variation in the waveguide width can be represented using appropriate functions, such as trigonometric, polynomial, or exponential functions. Other adiabatic MRR structures have been employed in Si [Yang, Shuyu, et al. "A single adiabatic microring-based laser in 220 nm silicon-on-insulator." Optics express 22.1 (2014): 1172-1180] and SiN ECLs [Corato-Zanarella, Mateus, et al. "Widely tunable and narrow-linewidth chip-scale lasers from near-ultraviolet to near-infrared wavelengths." Nature Photonics 17.2 (2023): 157-164], the entire contents of which being incorporated herein by reference, to decrease the propagation loss by minimizing the overlap between optical mode and sidewalls. Nevertheless, the design disclosed herein can specifically target the nonlinearity issue and provide the potential to enhance NL up to around 3 dB. The adiabatic MRR exhibit also improved robustness against fabrication variations, compared with regular MRR, and less electrical power is needed to thermally tune the resonance wavelength. The adiabatic MRR can be used in different embodiments of ECL configurations, another example being shown in FIG. 11B.

Figure 12:
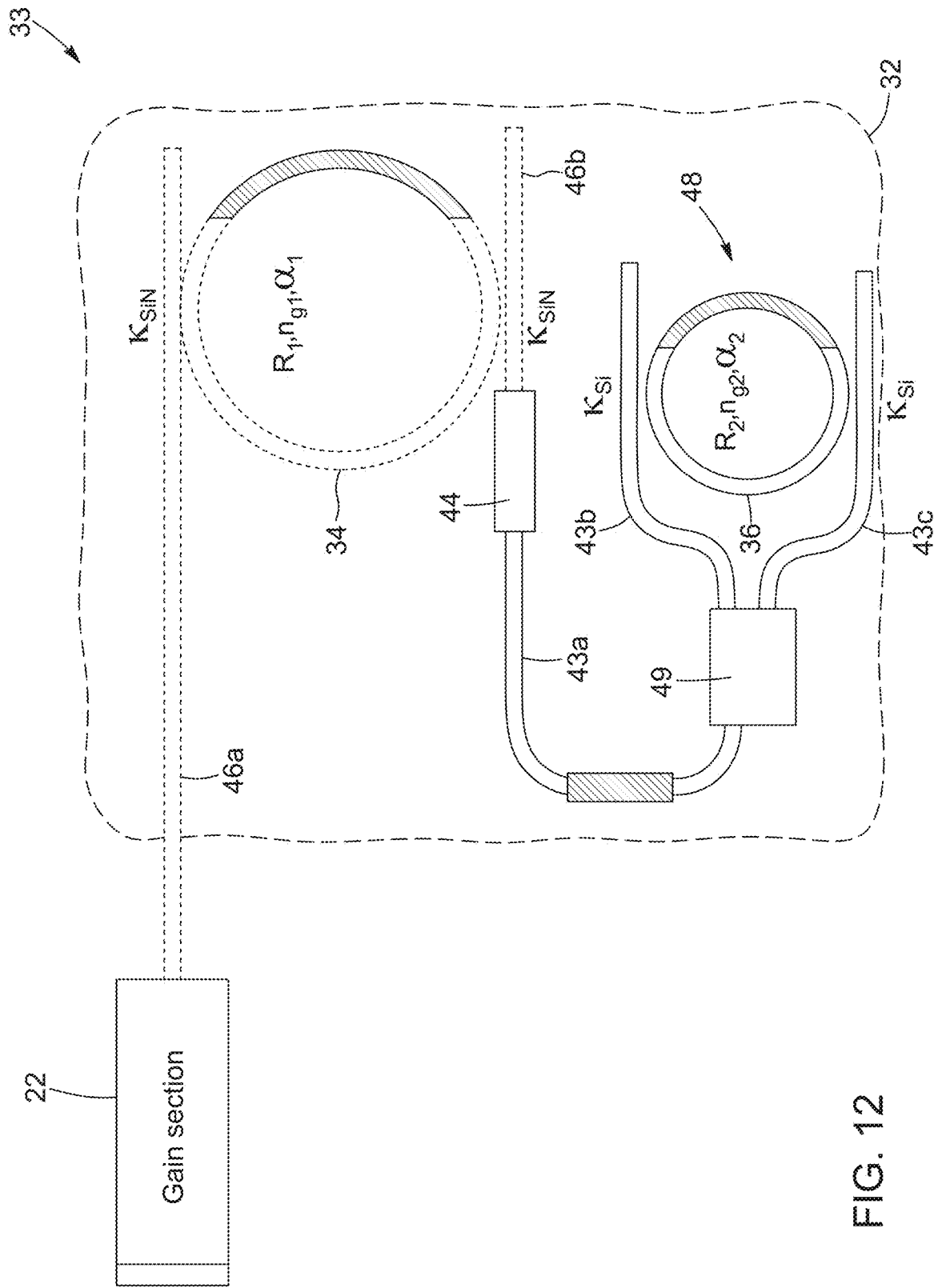
FIG. 12 is a schematic representation of an ECL configuration combining advantages of the configurations of FIGS. 2A and 5A.

Referring back to FIGS. 2A and 5A, there is shown two typical basic configurations of multi-material-based ECLs in which, on the one hand, both MRRs are placed inside a loop mirror (Vernier Config 1, see FIG. 2A), and on the other hand, a separate loop mirror added to the end of the cascaded MRRs (Vernier Config 2, see FIG. 5A). FIG. 12 shows a third basic configuration which brings together the configurations and advantages of both, especially when using the multi-material MRR-based ECL concept. In this configuration, the waveguide structure 33 is similar to that of FIG. 5A, in that light from the gain chip 22 first encounters a first SiN-layer waveguide branch 46a, is coupler into the first MRR 34 and exits through a second SiN-layer waveguide branch 46b. An optical via 44 provide a bridge to a first Si-layer waveguide branch 43a leading to a coupler 49. Here, the second MRR 36 is provided after the coupler 49 and forms part of the loop mirror 48. Light reaching the coupler 49 is therefore split into clockwise and counter-clockwise light portions, respectively coupled into a second and a third Si-layer waveguide branch 43b, 43c, both optical coupled to the second MRR 36. In effect, one MRR is placed outside of the loop mirror, and the other is added inside the loop mirror. As such, with the same multi-materials and cross-coupling coefficients used in the three basic configurations, this new configuration benefits from the lower linewidth of the configuration of and lower cavity loss and higher stability of the Vernier Config 1.

Figure 13A:
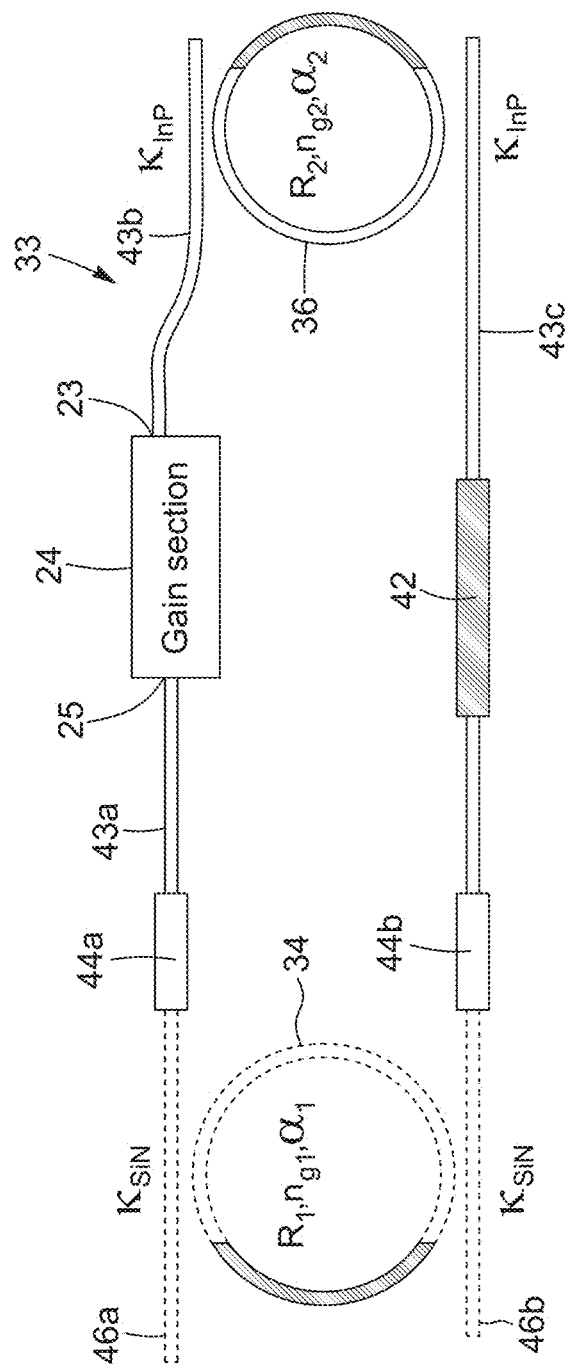
FIG. 13A is a schematic representation of an ECL ring cavity configuration according to one embodiment.
Figure 13B:
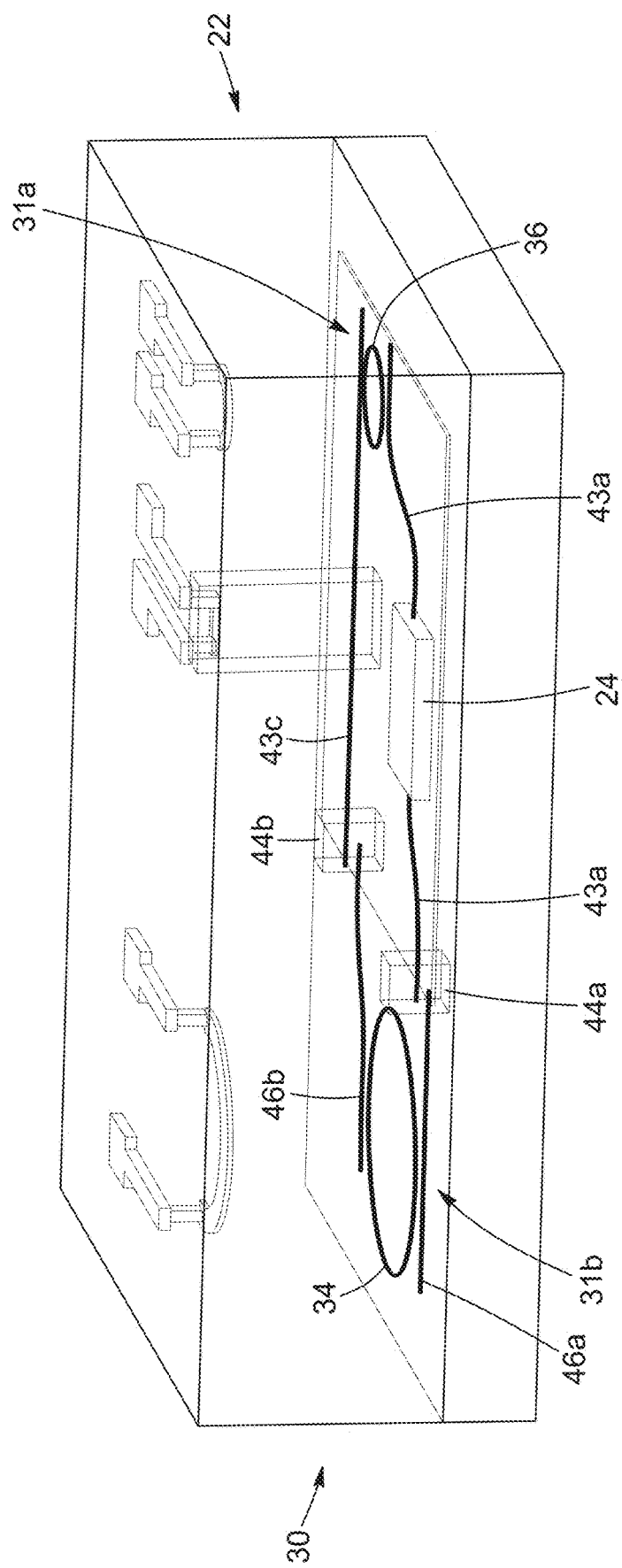
FIG. 13B is a side elevation view in partial transparency of a photonic integrated platform embodying the configuration of FIG. 13A.

The examples above show the resonant cavity of the ECL in a Fabry-Perot configurations. Referring to FIGS. 13A and 13B, in other embodiments, the resonant cavity may have a ring configuration. In one example of a ring configuration, the waveguide structure 33 may form a loop connected to both extremities 23, 25 of the gain waveguide 24. In the illustrated variant, the first functional layer 31a is hosted in the gain chip 22 and is for example made of a III-V material, and the second functional layer 31b is integrated in a reflector chip 30, for example made of SiN. The second (III-V) MRR 36 and the gain medium 24 are fabricated monolithically on the same III-V platform. Then, the III-V platform is heterogeneously integrated onto the SiN platform housing the first (SiN) MRR 34. The MRRs 34 and 36, along with the gain medium and a phase shifter 42, form a ring cavity in this example. The coupling between III-V and SiN waveguides may for example be performed using optical VIAs 44a, 44b.

Figure 14:
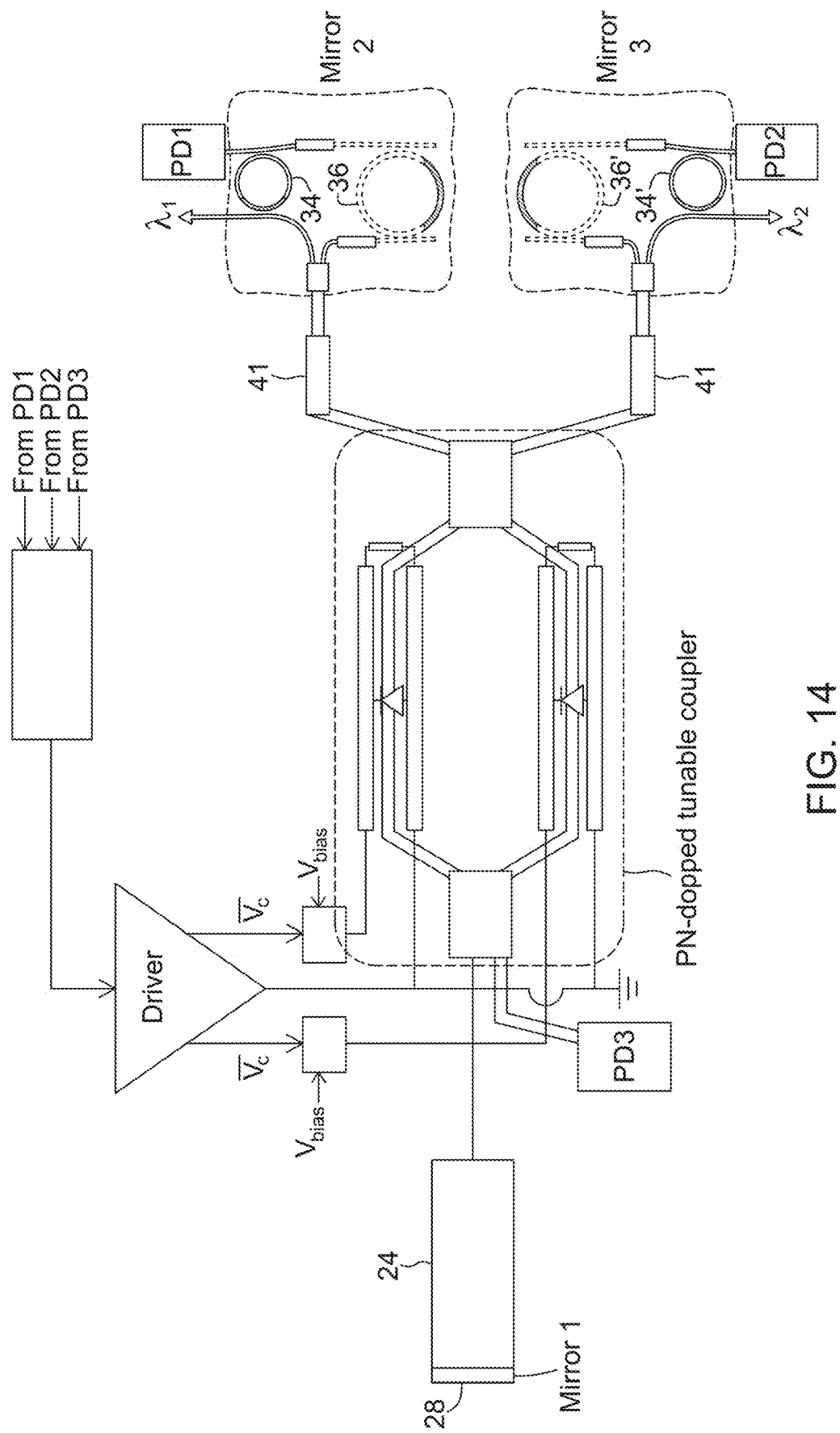
FIG. 14 is a schematic representation of a dual-wavelength laser source.

Referring to FIG. 14, there is show a dual-wavelength laser source 300. This could in which two separately tunable cavity reflectors 32a, 32b defining adjustable Vernier filters may be used to provide dual independently tunable wavelengths. Dual-wavelength sources have been investigated extensively using a large variety of different approaches. In the scheme proposed herein, the same gain chip 22 is used as the gain medium for both wavelengths. A tunable coupler 302 provides coupling between the gain chip 28 and the respective tunable cavity reflectors 32. In some implementation, in order to counteract spectral condensation to a single wavelength via gain competition, the relative strengths of feedback from the Vernier circuits may be adjusted with a thermally tunable Mach-Zehnder coupler (not shown). However, the tuning speed, i.e., in the kHz modulation speed range, of the thermally tunable coupler may cause instability in the laser output for either or both of the wavelengths. In other implementations, such as the one shown in FIG. 20, a high-speed tunable coupler 302 loaded with doped PN junctions for dual wavelength multimaterial ECLs, may allow the tuning speed to reach the GHz regime, thereby achieving stable dual wavelengths at the laser output.

Frequency Control

Figure 15:
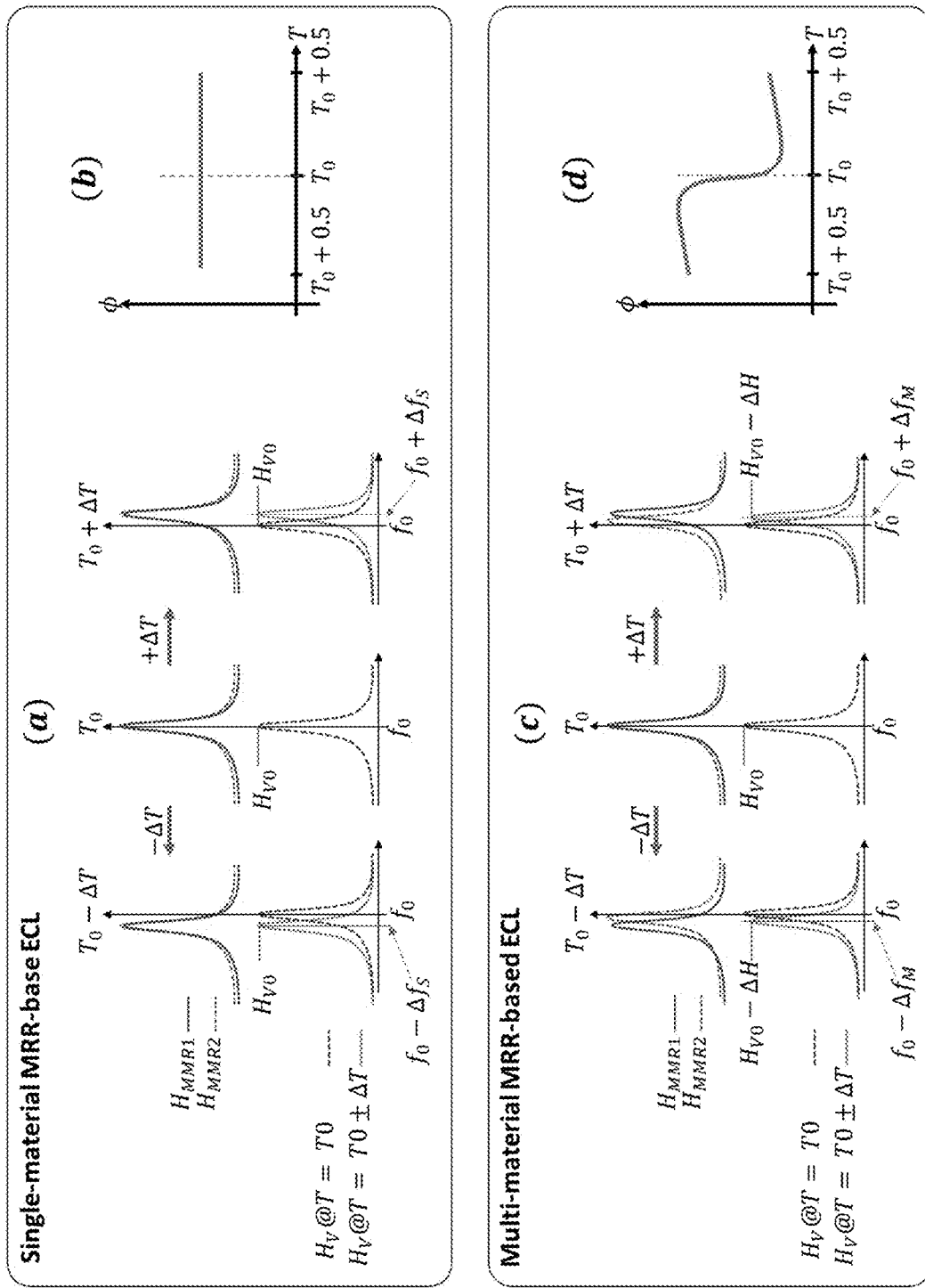
FIG. 15 shows a wavelength control methodology exploiting the multi-material nature of the proposed ECL.
Figure 16:
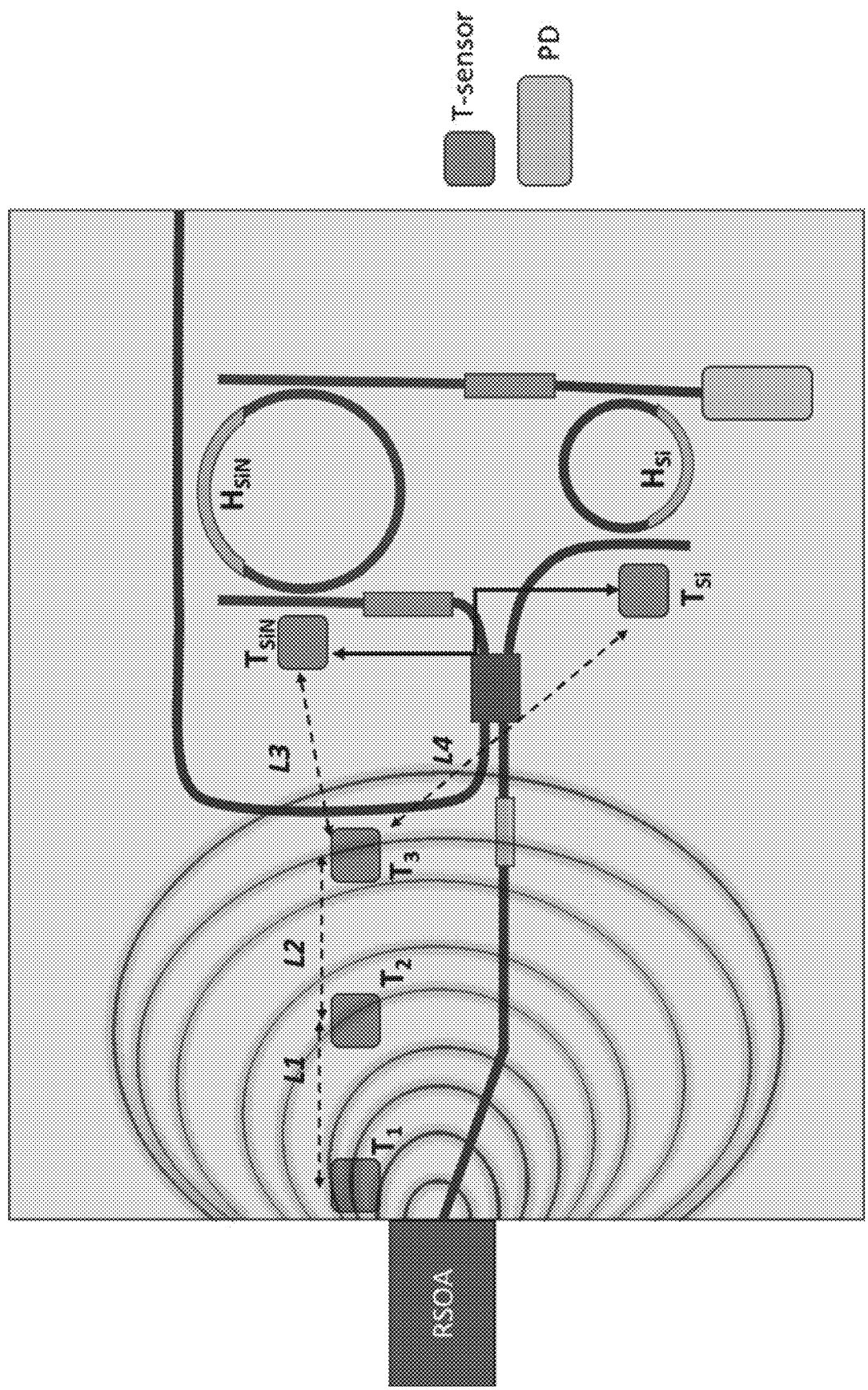
FIG. 16 illustrates an example of a distributed network of compact temperature sensors to predict and correct frequency shifts induced by thermal disturbances, here from an RSOA.
Figure 17:
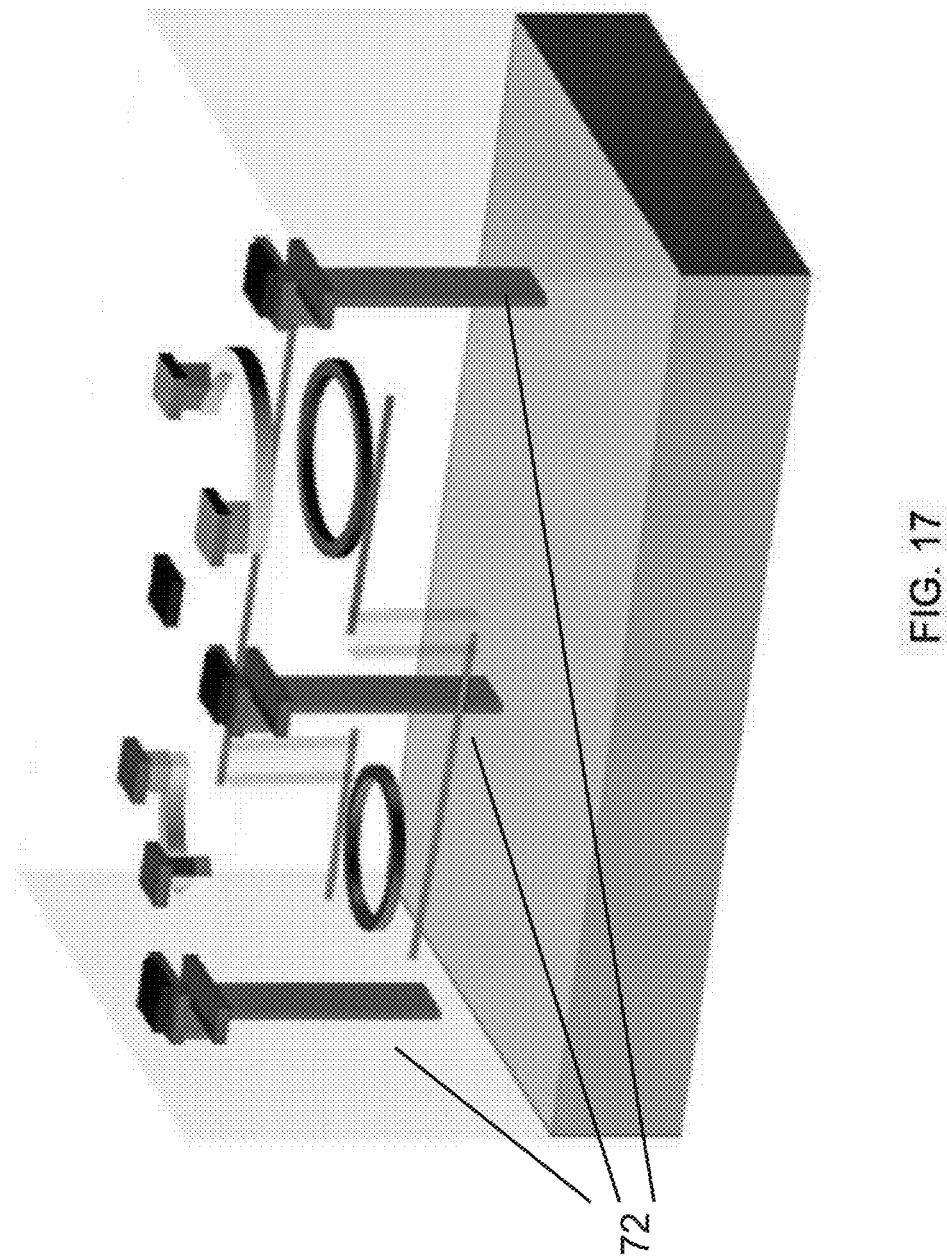
FIG. 17 shows how metal vias or studs can be used to increase the sensing path thermal resistance to the sensor.

In some embodiments, and with reference to FIGS. 15 to 20, the external cavity laser further includes a frequency-stabilization mechanism. The frequency-stabilization incudes a monitoring photodetector configured for measuring an estimated optical power outputted by the external cavity laser, a first heater being thermally connected with the second MRR to tune a resonance of the second MRR, based on the estimated optical power and a second heater being thermally connected with the first MRR to tune a resonance of the first MRR, based on the estimated optical power. In some embodiments, a distance between the first heater and the second MRR is smaller than a distance between the second heater and the first MRR. In some embodiments, the external cavity laser further includes a 90-degree coupler optically coupled with the first MRR and the second MRR to measure a phase difference between the external laser cavity's outputs. In some embodiments, the first heater and the second heater are respectively monolithically integrated with the second MRR and the first MRR. In some embodiments, the external cavity laser further includes a plurality of temperature sensors positioned between the gain chip and the resonant cavity, the plurality of temperature sensors being configured to monitor a thermal wave propagation, wherein the first heater and the second heater are adjusted based on the monitored heat transfer. In some embodiments, the external cavity laser further includes a plurality of studs (see the elements numbered 72 in FIG. 17, for example), each being connected to a corresponding one of the plurality of temperature sensors and extending through the first and second functional layers. Of note, the MRRs and the temperature sensors and resistors of FIG. 17 are similar to the ones having been previously described. In some embodiments, the external cavity laser further includes auxiliary temperature sensors configured to measure external thermal perturbations.

In some implementations, tunable ECLs may require for their frequency to be controlled with a relatively high precision and short-term and long-term stability. For example, in coherent communications systems, both the amplitude and phase of the light signal are used to encode information. Any instability in the laser frequency will cause errors in the received signal, which negatively affects the overall performance of the coherent communication system.

In this regard, embodiments of the ECL disclosed herein may leverage the thermal stability advantages of lower index silicon materials, such as for example SiN or QXP, while maintaining the rapid switching or tuning time and reduced tuning power capabilities of Si. This may result in a laser operation that is more robust while exhibiting enhanced short-term and long-term stability. It will however be readily understood that the same benefits may be achieved using other multi-material combinations such as III-V materials and their respective binary, ternary, and quaternary compounds, or alloys, such as InP and InGaAsP, to name a few. In the example below, SiN which has a lower index than silicon, is used paired with Si as an illustrative example. Of note, while the following paragraphs refers to SiN only, other similar materials could be used.

Thermal conductivity (TC) of Si and SiN is about 150 W/m/K and about 55 W/m/K at room temperature (i.e., about 300 K), respectively. Therefore, Si conducts heat roughly three times better than SiN. The thermo-optical coefficient (TOC) of Si and SiN at room temperature is about $1.86 \times 10^{-4}$ K$^{-1}$ and about $2.45 \times 10^{-5}$ K$^{-1}$, respectively. Therefore, SiN requires a significantly higher temperature than Si to produce the same amount of phase shift. SiO2 has a TOC of about $1 \times 10^{-5}$ K$^{-1}$. Combining thermal advantages of both materials, the proposed hybrid Si—SiN ECL can provide a stable and fast switching/tuning lasing operation suitable for a wide range of applications. As an example, given its ability to provide high output optical power, the proposed hybrid MRR structure is capable of fast wavelength switching/tuning, which can be, for example and without being limitative, of great interest for LiDAR applications. The faster wavelength tuning gain is achieved by applying a coarse tuning through the heater of the Si MRR followed by a fine-tuning through the heater of the SiN MRR. In this way, since the TOC$_{Si}$ is around an order of magnitude higher than TOC$_{SiN}$, a temperature change of ΔT can displace the Si ring filter's resonance wavelength several times more than that of SiN. The major heat transfer medium for the heat transfer is silica. Using the heaters mentioned above, the SiN could be placed closer to its related heater, helping to operate with a lower electrical power consumption. The thermal crosstalk can be ignored if a sufficient separation is provided between the MRRs.

Figure 20:
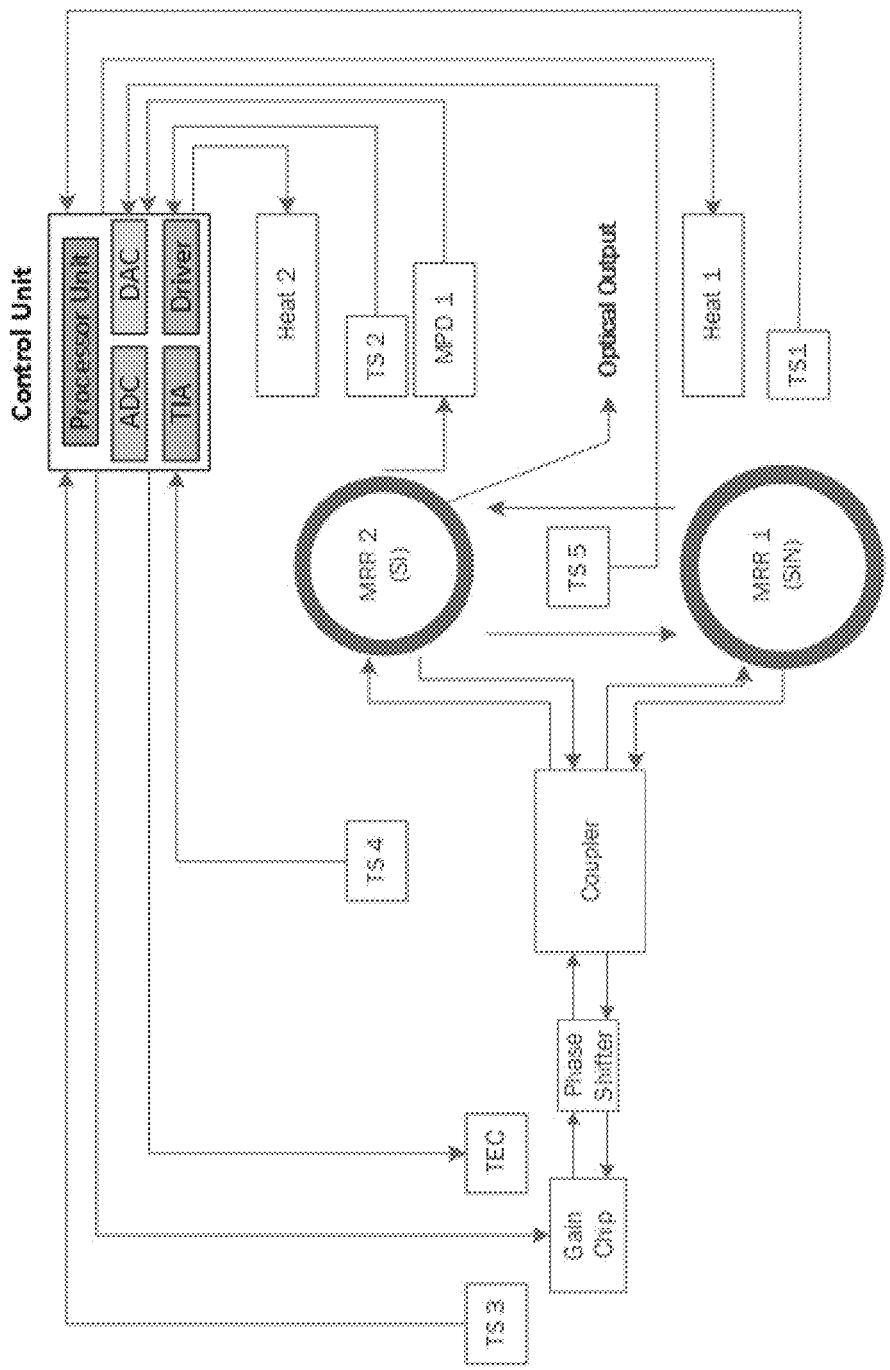
FIG. 20 is a block diagram of an ECL with associated controlling elements.

Referring to FIG. 20 there is shown a block diagram of components of an ECL according to one variant and the associated controlling elements. A control unit is provided and has embedded therein multiple-channel ADCs and DACs in the general form. A minimal configuration for the wavelength tuning could consist of only one PD and one temperature sensor. The box labelled "Heat 1" is the heater 50 of the first MRR 34 (made from SiN) and the box labelled "Heat 2" is the heater 50 of the second MRR 36 (made from Si). Note that, through this document Heat 1 and HSiN will be used interchangeably, as will Heat 2 and H$_{Si}$. The box labelled "MPD1" is a monitoring photodetector 202 for reading out an estimate of the output optical power coupled out from the ECL. Note that throughout this document PD and MPD are interchangeably used to refer to the monitoring photodetector. In the illustrated embodiment, there are five temperature sensors labelled "TS1" through "TS5"; each of which can refer to any passive or active device either embedded in or mounted on top of the MRRs. Again, note that through this document TS1 and T$_{SiN}$ will be used interchangeably, as will TS2 and T$_{Si}$. In fact, for accurate temperature measurement of the silicon waveguide, the temperature sensors (e.g., thermistors) ideally need to be integrated directly onto the silicon ring resonators.

However, this direct integration would significantly increase optical propagation loss due to the interaction between the thermistor material and the optical mode within the silicon ring waveguides. To mitigate this issue, the temperature sensors can either be placed on top of the silicon ring resonators, with a separation provided by the upper silicon dioxide cladding layer, or use doped silicon positioned in parallel to the silicon ring resonators on the same silicon device layer. Known examples of the latter are I(or V)-PTAT (current (or voltage) proportional to absolute temperature) and I(or V)-CTAT (current (or voltage) complementary to absolute temperature) circuits for sensing temperature. The techniques involved in these examples outline a general approach to accurately set and control the frequency, stability, and accuracy of multi-material ECLs. Integrated ECLs are particularly sensitive to thermal disturbances after initial settings. These disturbances can arise from sudden or gradual variations in package temperature and/or changes in the gain medium current, which have a relatively significant impact on the frequency accuracy of the ECLs due to the high thermal sensitivity of MRRs. The existing technique can provide a stabilization or an adjustment back to the initial spectral location, albeit with a relatively long stabilization time, which is not desirable for many applications. Note, that one major step before switching in the stabilization algorithm, is collecting the contour map—i.e., the current values for the heaters of the first and second MRRs along with the corresponding derived wavelength—of the proposed hybrid ECL.

Varying conditions (e.g., several hundred milliamps of laser current changes and a wide range of ambient temperature fluctuations over the entire frequency tuning range and throughout the device's lifetime) have traditionally impeded or limited a real-time, near real-time, or faster recovery of the initial spectral characteristics of a signal while maintaining higher frequency accuracy. The multi-material approach herein described can address this challenge. One solution is to take advantage of multi-material nature of the proposed ECL. In the case of a single-material MRR-based ECL, when a thermal disturbance happens, the response of both MRRs shift by nearly the same amount and in the same direction, as shown in plots (a) and corresponding graph (b) of FIG. 15. Hence, without using thermal sensors, detecting, measuring and correcting a wavelength shift may not be possible using only MPDs. The first row of plots (c) in FIG. 15 shows the individual MRRs' transfer functions for a resonance frequency at a set temperature T$_0$ and temperature variations ±ΔT, while the second row shows the Vernier transfer function for the same temperature variations. One significant advantage of the multi-material MRR-based ECL structures (e.g., Si and SiN) is that due to the different TOCs, for a given temperature disturbance, the amount of filter response shifts of the two MRRs are not the same, as shown in graph (d) of FIG. 15. This effect can be exploited to detect the power drop in the laser output using monitoring MPDs and adjust the wavelength accordingly. Additionally, by leveraging the disparity in TOCs of both MRRs, the direction of the shift can also be detected, for example, using a 90-degree hybrid coupler connected to ports of the MRRs to measure the phase difference between the ECL's outputs, as shown in graph (d) of FIG. 15. Such a detection cannot be achieved using single-material ECLs, as shown in graph (b) of FIG. 15.

In some embodiments, the frequency control can be refined using a distributed network of compact temperature sensors to predict and correct frequency shifts induced by thermal disturbances from the RSOA or other external sources. For example, as shown in FIG. 16, the temperature changes in the RSOA and thermal wave propagation can be effectively monitored using the temperature sensors positioned near the RSOA and close to the MRRs, which allows for adjustments to the metal heaters associated with the first and second MRRs. With real-time or near real-time temperature readings (compared to the dynamics of the thermal wave and the control loop) from the temperature sensors, it is possible to calculate the thermal wave speed in the SOI. Knowing the distances between temperature sensors, a robust real-time feedback or correction could accurately predict and compensate for temperature variations, thereby dynamically adjusting the heaters associated with the first and second MRRs. This method could be useful for maintaining frequency accuracy and/or stability in integrated ECLs, which may be required or desired in many applications, including, for example and without being limitative, optical coherent communication systems.

In some embodiments, metal via walls or studs connected to the temperature sensors and passing through the $SiO_2$ layer can be used to enhance the sensing speed of the temperature sensors. This configuration allows for a more efficient internal heat transfer process, as metals has much higher thermal conductance than $SiO_2$, either in vertical or horizontal directions in PIC, to compensate the other perturbations from other external sources.

Several methods to tune the laser with the MRR heater currents (or powers equivalently) can be accessible. The control unit is configured to calculate the pair of currents that results in least power consumption. One known solution to increase the power efficiency of the heaters is isolating each MRR through using air trenches or/and air undercuts while increasing the controllability of the ECL by further reducing the thermal crosstalk between the MRRs. Performing trenches and undercuts induce extra cost and may not be desired since it may reduce the yield of the final chip. In that case, the thermal crosstalk in the middle of the two rings can be sensed by another sensor (labelled "TS5" in FIG. 20) and along with two proximity sensors TS1 and TS2 of the rings, the crosstalk effect can be alleviated. TS4 is placed between RSOA and the rings but within a far distance to indicate the ambient temperature as a reference. Later, in the crosstalk nulling algorithm, it can be used to zero offset the effect of the reference in calculating the optimal current pair of the heaters. The feedback circuit using multiple materials with different TOCs could help achieve a temperature-insensitive ECL.

In some embodiments, auxiliary temperature sensors positioned adjacent to each sensor and/or the via wall are used for sensing external thermal perturbations (e.g., convection). The control unit can predict the next step values for the currents of the heater based on the information collected from all the thermal sensors. In some embodiments, integrated sensors can be used instead of thermal sensors with via walls. In some embodiments, a via wall is positioned between the two MRRs and an auxiliary adjacent sensor without via wall is provided in the control unit. This configuration allows calculating the thermal crosstalk between the heaters of the MRRs without disturbing the optical mode of the waveguide along with, which can later be exploited in adjusting the wavelength in response to a perturbation. This distribution method can be useful in predicting the wavelength shift direction swiftly, via temperature change direction, and hence adjusting the heater currents accordingly.

Figure 18B:
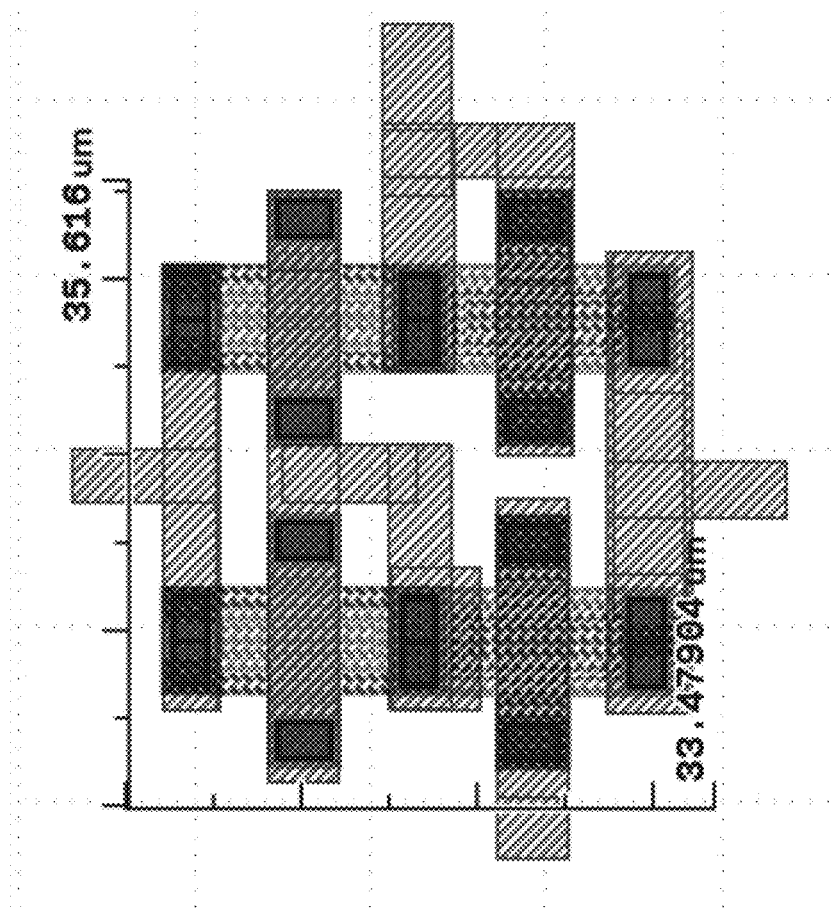
FIG. 18A and FIG. 18B show an example of a temperature sensor using MOSFET transistor taken from and a layout of the sensor in a PIC.
Figure 18A:
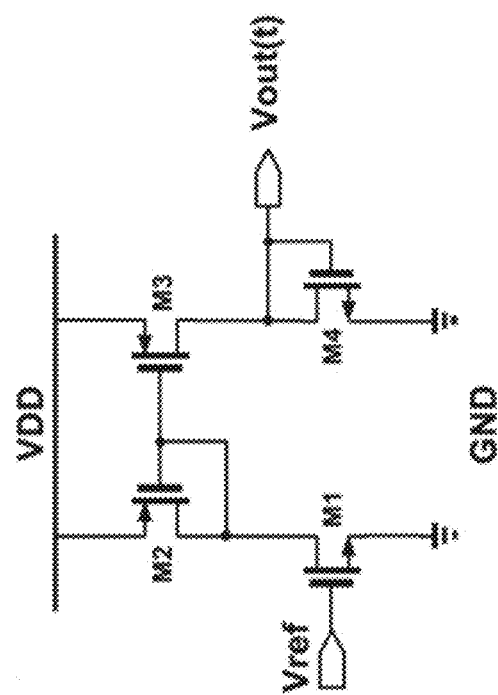

To implement the distributed network of compact sensors, it is possible to leverage the thermal characteristics of doped semiconductor electronic devices such as transistors. Instead of building them on a dedicated electronic platform and then attaching them to the ECL PIC in a hybrid configuration, recent advancements have demonstrated the integration of Bipolar Junction Transistors (BJT) and Metal-Oxide-Semiconductor Field-Effect Transistors (MOSFET) into SOI technology. By designing these transistors to optimize their thermal characteristics, it is possible to design temperature sensor circuits and fabricate them monolithically within the same SOI platform as the ECL. This approach allows the sensors to be placed in proximity to the MRRs, thereby enabling accurate measurement of local temperatures in the ECL PIC. FIGS. 18A-B show an example of a temperature sensor circuit schematic with a MOSFET transistor layout on the SOI platform, demonstrating the feasibility of this approach.

Integrating these sensors directly onto the SOI platform and placing them close to the MRRs offers several advantages. First, it reduces the overall footprint of the system. Second, it enhances thermal management by providing precise local temperature monitoring. Third, it allows compensating for thermal crosstalk between the heaters of each MRR, where the heater of one of the MRRs could also impact the refractive index change in the other MRR. As mentioned above, in previous research, deep trenches and undercuts are typically used for temperature isolation. This type of solution increases design complexity and fabrication process and cannot completely mitigate the temperature crosstalk effect.

Figure 19:
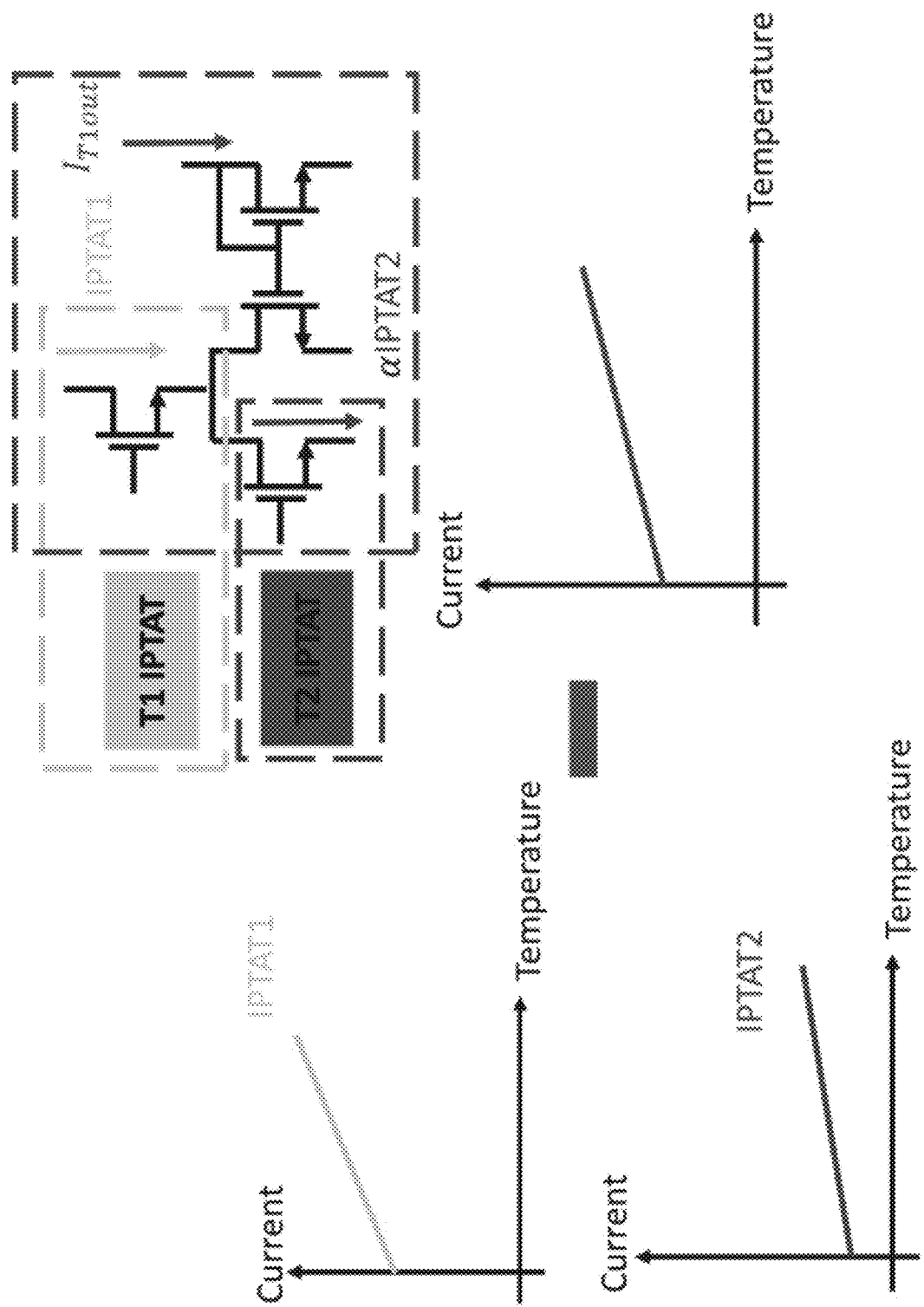
FIG. 19 illustrates how a temperature circuit sensor can be used to address the thermal crosstalk between the MRR heaters.

In some embodiments, such as the one shown in FIG. 19, a temperature circuit sensor is used to address this issue. In this method, two temperature-dependent generated currents from sensors $T_{SiN}$ and $T_{Si}$ (shown in FIG. 16) are subtracted from each other and are used to cancel out the crosstalk effect through controlling heaters. It is important to note that this cancellation (or subtraction) is performed using a coefficient called alpha ($\alpha$). This coefficient represents the influence of the HSiN on the $T_{Si}$. If the $H_{Si}$ is off, it will be disconnected from output stage of the T1 by a switch. For simplicity, it is shown in FIG. 19. $T_{SiN}$ and $T_{Si}$ can be I(or V)-PTAT or I(or V)-CTAT circuits for sensing temperature. These current-dependent temperature sensors are connected together at the output stage and their current will be subtracted, as shown in FIG. 19, depicting how temperature circuit sensor can be used to address the thermal crosstalk between the MRR heaters issue. No need to say, that if there are other deterministic thermal sources, like the one from RSOA, around the MRRs, the same technique can be used to null the crosstalk effect.

Following a similar path, other integrated electronic circuits could be incorporated into the SOI platform to create more robust ECLs. For example, transimpedance amplifiers (TIAs) can be added directly to the SOI platform where the ECL is fabricated. By placing TIAs next to the monitoring MPDs, it becomes possible to amplify the MPD current right at the source. Although the applications of the present technology require a low speed around the kHz range, integrating TIAs on the SOI platform can improve performance by reducing noise and parasitic effects. This approach ensures that the initial amplification occurs in proximity to the MPDs, minimizing signal degradation before further amplification can be performed off-chip with conventional amplifiers. Compared to traditional methods, where a MPD is wire-bonded to a TIA in a CMOS chip, this integration on the SOI platform can offer better noise performance and reduced parasitic losses. Additionally, the temperature effects of TIAs can be mitigated by trenching or integrating temperature sensors, ensuring stable performance.

Moreover, integrating the TIA circuit into the PIC can also address the headroom issues associated with the low voltage power supply of advanced CMOS nodes. By level-shifting the TIA output for CMOS compatibility, the PIC's compatibility with advanced CMOS technology is enhanced.

Drivers and monitoring circuits using Metal-Semiconductor Field-Effect-Transistor (MESFET) and BJT components could be integrated to the SOI platform. These devices can provide high current driving capabilities and are compatible with advanced CMOS processes that may not support BJT or MESFET. This integration not only improves the compatibility of our system with advanced nodes but also allows for more precise temperature control and reduced thermal crosstalk.

Electronic circuits integrated into the SOI PIC can be used for characterizing process variations in active components like modulators, MPDs, and heaters with PN junctions, for example to monitor doping concentration variations from chip to chip and wafer to wafer. These circuits can detect and quantify variations in doping concentration, which is crucial for ensuring the consistency and reliability of the active components over time. This information is invaluable for calibrating the thermal sensors and power readings from the MPDs. By accurately understanding and compensating for process variations, the precision of the ECLs is enhanced. As an example, if the specific variations in doping concentrations is identified, the calibration parameters of the temperature sensors and MPDs can be adjusted accordingly, leading to more accurate measurements and improved performance of the overall system. This approach ultimately simplifies the calibration process and ensures the reliable operation of our ECLs across different manufacturing batches.

Additionally, for long-term stability and performance, integrate circuits helping the recalibration the PIC and coefficients (for example, for temperature sensors, MPDs, etc.) can be used to account for aging effects. As components age, the characteristics of the PN junctions and metals can change due to heat and current. Monitoring these aging effects can be achieved with circuits designed to detect shifts in performance. Implementing such aging monitors within a PIC can provide real-time feedback on component health, enabling timely recalibrations and maintaining optimal performance. One concern about applying these aging monitoring circuits may be their requirement for large number of pads on the chip which may cause them to seem impractical. However, by designing an electronic multiplexer or switch into the PIC, it is possible to connect multiple circuits to fewer pads, streamlining the integration process and reducing the complexity of interfacing with external circuits.

Now that the general concept of frequency control has been presented, the embodiments presented in FIG. 20 will be described in greater detail. The box labelled "TS" is monitoring the temperature in the vicinity of the first MRR 34. In some embodiments, the coarse adjustment can be based on the reading from this temperature sensor, whereas for the fine tuning of the wavelength the more accurate and faster sensing device (e.g., MPD1) is used to readjust the required current to force back the laser to its locked mode. Additionally, a second thermal sensor—represented by the box "TS" in FIG. 20—monitors the temperature near the gain chip 22. In some embodiments, a thermoelectric cooler can be used to draw heat away from the combined chip, maintaining a desired temperature. A PID controller can be embedded virtually in the control unit, or a more efficient algorithm (e.g., finite-state-machine (FSM), fuzzy controller or model-predictive control) can be considered to implement the tuning process and lock the feedback system on the right wavelength in a short amount of time.

In some implementations, to further overcome the challenge of low thermal tuning speed of around tens of kHz and increased power consumption of around tens mW for wavelength tuning that is mentioned above, one strategy is to use p-type and n-type doped Si to embed a PN-junction in the Si MRR core waveguide and enable electro-optical tuning using plasma dispersion effect besides the thermo-optical mechanism. Using an additional electro-optical tuning mechanism that relies only on the Si mirroring can enhance the tuning speed significantly and enable more degrees of freedom to control the system. However, having the doped Si in the core waveguide can increase the losses and degrade the narrow linewidth requirement. To fix this issue it is possible to redesign the SiN or QXP ring to achieve ultra-high quality-factor (Q) and reduce the linewidth significantly.

Advantages and Applications

Implementations of the ECL described herein using Si and SiN as the materials of the first and second functional layers may advantageously integrate the compactness and compatibility of the Si platform with the low propagation loss and high nonlinearity threshold of lower index silicon material platforms. By combining these attributes, the resulting ECL can offer enhanced static performance compared to Si-based ECLs, such as narrower linewidth, wider tunability range, and higher output power (for example using a relatively lower Q Si MRR and larger Q SiN MRR). Additionally, embodiments of the described ECL may benefit from the thermal stability advantage of the lower index silicon material, while maintaining the faster switching/tuning time and less tuning power capabilities of Si. Advantageously, in some implementations the laser output power may be directly coupled into passive/active devices, such as modulators or photodiodes, through the Si waveguides. The SiN waveguides can then be utilized to minimize mode mismatch and optimizes optical coupling between the gain chip, optical fibers, and the silicon chip, enhancing overall performance and integration efficiency.

Advantageously, embodiments of the ECL described herein, using various combinations of materials, could offer a range of applications across diverse fields, underpinned by its combination of performance characteristics. In communications, the possibility for a lower linewidth, larger output power, and short-long-term stability could position it as a strong candidate for integrated Intensity-Modulation-Direct Detection (IM-DD) and coherent silicon photonic transceivers, potentially operating in various spectral ranges, including the C, L, and O bands. In sensing, the ECL could leverage SiN MRR, for instance, as an interface for biomolecular detection, proving valuable for environmental monitoring, medical diagnostics, and industrial process control. For LiDAR, the ECL's potential high power and rapid tuning could contribute to accurate, high-resolution distance measurements, a promising prospect for autonomous vehicles and 3D mapping. In quantum optics, SiN ECLs have recently been shown to generate a tunable quantum light source that can enhance quantum information processing systems. In some implementations, the ECL may cater to the unique needs of both SOI and SiN quantum circuits, possibly enabling precise manipulation of quantum states of light.

Finally, to seamlessly realize such multi-material and multi-layer ECLs in practice, existing fabrication processes offered by various foundries, which integrate multiple silicon materials such as, SiN/Si-on-InP, SiN-on-Si and QXP-on-Si, may be leveraged. Therefore, the proposed approach could provide a practical and accessible ECL, potentially advancing quantum computing, communication, and sensing technologies.

Of course, numerous additional modifications could be made to the embodiments described above without departing from the scope of protection as defined in the appended claims.

The invention claimed is:

1. An external cavity laser, comprising:
   a photonic integrated platform comprising a gain chip providing a gain medium and at least one reflector chip;
   a resonant cavity optically coupled to the gain medium and comprising a first and a second micro-ring resonators (MRR) in a Vernier configuration provided in the at least one reflector chip, the first MRR and second MRR being made of different materials and having corresponding different group indices, the first and second MRRs having different radii selected in view of said corresponding different group indices, wherein the at least one reflector chip consists of a monolithic reflector chip integrating first and second functional layers respectively comprising the first and second MRRs;
   a tuning mechanism for tuning a spectral response of at least one of the first and second MRR; and
   a waveguide structure defining said resonant cavity, the waveguide structure comprising:
      the first and second MRRs;
      one or more waveguide branches extending in each functional layer; and
      one or more optical vias allowing light to travel between the functional layers of the monolithic reflector chip.

2. The external cavity laser according to claim 1, wherein the gain chip comprises a semiconductor optical amplifier.

3. The external cavity laser according to claim 1, wherein the gain medium is quantum well-based, quantum wire-based, quantum dot-based or quantum dash-based.

4. The external cavity laser according to claim 1, wherein each of the at least one reflector chip comprises a substrate and a cladding extending over the substrate, each of the first and second MRRs being embedded in the cladding of one of said at least one reflector chip.

5. The external cavity laser according to claim 4, wherein the substrate of the reflector chip is made of Si, and the cladding of the reflector chip is made of $SiO_2$.

6. The external cavity laser according to claim 1, wherein the material of the first MRR is Si, and the material of the second MRR is SiN.

7. The external cavity laser according to claim 1, wherein the materials of the first and second MRRs are each selected from the list consisting of Silicon (Si), Silicon Nitride (SIN), Indium Phosphide (InP), Gallium Arsenide (GaAs), Gallium Nitride (GaN), Aluminum Nitride (AlN), Indium Gallium Arsenide Phosphide (InGaAsP), Indium Gallium Arsenide Antimonide (InGaAsSb), Mercury Cadmium Telluride (HgCdTe), Gallium Nitride (GaN), Aluminum Nitride (AlN), Gallium Arsenide (GaAs), Aluminum Nitride Arsenide (AlGaAs) Aluminum Nitride (AlN), QXP, and Lithium Niobate (LiNbO3), Barium Titanate BaTiO3 (BTO), or binary, ternary, and quaternary compounds and alloys thereof.

8. The external cavity laser according to claim 1, wherein a ratio of the radi of the first and second MRRs is proportional to a ratio of their group indices.

9. The external cavity laser according to claim 8, wherein the ratio of the radii of the first and second MRRs substantially corresponds to:

$$\frac{R_2}{R_1} \approx \frac{(m-1)}{m} \frac{n_{g_1}}{n_{g_2}},$$

wherein $R_1$ is the radius of the first MRR, $R_2$ is the radius of the second MRR, $n_{g_1}$ is the group index of the material of the first MRR, $n_{g_2}$ is the group index of the material of the second MRR, and m is a tuning enhancement factor.

10. The external cavity laser according to claim 8, wherein the ratio of the radii of the first and second MRRs substantially corresponds to:

$$\frac{R_2}{R_1} \approx \frac{(m-1)}{N \times m} \frac{n_{g_1}}{n_{g_2}},$$

wherein $R_1$ is the radius of the first MRR, $R_2$ is the radius of the second MRR, ng1 is the group index of the material of the first MRR, $n_{g_2}$ is the group index of the material of the second MRR, m is a tuning enhancement factor and N is a reduction factor associate with the material of the first MRR.

11. The external cavity laser according to claim 1, wherein the resonant cavity has a Fabry-Perot configuration and comprises a fixed cavity reflector optically coupled to one extremity of the gain medium, the first and second MRRs forming a tunable cavity reflector optically coupled to an extremity of the gain medium opposite the fixed cavity reflector.

12. The external cavity laser according to claim 11, wherein the fixed cavity reflector comprises a layer of reflective material extending along a surface of the gain chip.

13. The external cavity laser according to claim 1, the waveguide structure comprising:
   a coupler separating light into clockwise and counter-clockwise portions travelling in opposite directions through said waveguide structure.

14. The external cavity laser according to claim 13, wherein the waveguide structure comprises a loop mirror closing a feedback circuit in the resonant cavity.

15. The external cavity laser according to claim 14, wherein one of the first and second MRRs is inside the loop mirror.

16. The external cavity laser according to claim 13, wherein at least one of the first and second MRRs comprises a plurality of MRR components.

17. The external cavity laser according to claim 13, wherein at least one of the first and second MRRs has a variable width section.

18. The external cavity laser according to claim 1, further comprising a frequency-stabilization mechanism, the frequency-stabilization comprising:
   a monitoring photodetector configured for measuring an estimated optical power outputted by the external cavity laser;

a first heater being thermally connected with the second MRR to tune a resonance of the second MRR, based on the estimated optical power; and a second heater being thermally connected with the first MRR to tune a resonance of the first MRR, based on the estimated optical power.

19. The external cavity laser according to claim 18, wherein a distance between the first heater and the second MRR is smaller than a distance between the second heater and the first MRR.

20. The external cavity laser according to claim 18, further comprising a 90-degree coupler optically coupled with the first MRR and the second MRR to measure a phase difference between the external laser cavity's outputs.

21. The external cavity laser according to claim 18, wherein the first heater and the second heater are respectively monolithically integrated with the second MRR and the first MRR.

22. The external cavity laser according to claim 18, further comprising a plurality of temperature sensors positioned between the gain chip and the resonant cavity, the plurality of temperature sensors being configured to monitor a thermal wave propagation, wherein the first heater and the second heater are adjusted based on the monitored thermal wave propagation.

23. The external cavity laser according to claim 1, further comprising auxiliary temperature sensors configured to measure external thermal perturbations.

* * * * *